US006505057B1

(12) United States Patent
Finn et al.

(10) Patent No.: US 6,505,057 B1
(45) Date of Patent: Jan. 7, 2003

(54) INTEGRATED VEHICLE VOICE ENHANCEMENT SYSTEM AND HANDS-FREE CELLULAR TELEPHONE SYSTEM

(75) Inventors: Brian M. Finn, Madison, WI (US); Michael P. Nowak, Greendale, WI (US)

(73) Assignee: Digisonix LLC, Madison, WI (US)

( * ) Notice: Subject to any disclaimer, the term of this patent is extended or adjusted under 35 U.S.C. 154(b) by 0 days.

(21) Appl. No.: 09/012,529

(22) Filed: Jan. 23, 1998

(51) Int. Cl.[7] .................................................. H04B 1/38
(52) U.S. Cl. ........................ 455/569; 455/575; 455/557
(58) Field of Search ................................ 455/569, 557, 455/556, 575, 90, 566; 379/410, 391, 406, 388; 381/71, 94, 66

(56) References Cited

U.S. PATENT DOCUMENTS

| | | | | |
|---|---|---|---|---|
| 4,025,721 A | | 5/1977 | Graupe et al. | 179/1 P |
| 4,630,305 A | | 12/1986 | Borth et al. | 381/94 |
| 4,737,976 A | | 4/1988 | Borth et al. | 379/58 |
| 5,099,508 A | * | 3/1992 | Inaba | 379/393 |
| 5,259,035 A | | 11/1993 | Peters et al. | 381/110 |
| 5,323,459 A | * | 6/1994 | Hrano | 379/391 |
| 5,325,437 A | * | 6/1994 | Doi et al. | 381/710 |
| 5,371,789 A | * | 12/1994 | Hirano | 379/410 |
| 5,432,859 A | | 7/1995 | Yang et al. | 381/94 |
| 5,550,924 A | | 8/1996 | Helf et al. | 381/94 |
| 5,553,134 A | | 9/1996 | Allen et al. | 379/387 |
| 5,574,824 A | | 11/1996 | Slyh et al. | 395/2.35 |

(List continued on next page.)

FOREIGN PATENT DOCUMENTS

| | | | |
|---|---|---|---|
| EP | 0 640 953 | 3/1995 | |
| EP | 0758 830 A2 * | 2/1997 | H04M/9/08 |
| EP | 0758830 A2 | 2/1997 | |
| EP | 0 789 476 | 8/1997 | |
| EP | 07879476 A2 * | 8/1997 | H04M/9/08 |
| WO | 07/34290 | 9/1997 | |

OTHER PUBLICATIONS

"The Use of Orthogonal Transforms for Improving Performance of Adaptive Filters", Marshall et al., IEEE Transactions on Circuits and Systems, vol. 36, No. 4, Apr. 1989 (pp. 474–483).

"Transform Domain LMS Algorithm", Narayan et al., IEEE Transactions on Acoustics, Speech, and Signal Processing, vol. ASSO-31, No. 3, Jun. 1983 (pp. 609–614).

"Frequency-Domain and Multirate Adaptive Filtering", John J. Shynk, IEEE SP Magazine, Jan. 1992 (pp. 15–35).

*Primary Examiner*—Edward F. Urban
*Assistant Examiner*—Tilahun Gesesse
(74) *Attorney, Agent, or Firm*—Andrus, Sceales, Starke & Sawall, LLP

(57) ABSTRACT

An integrated vehicle voice enhancement system and hands-free cellular telephone system implements microphone steering techniques and noise reduction filtering to improve the intelligibility and clarity of transmitted signals. A microphone steering switch is provided for the cellular telephone interface which allows only one of the microphones to be switched in to an "on" state at any given time. The microphone steering switch generates a raw telephone input switch that is a combination of 100% of the designated primary microphone signal and approximately 20% of the microphone signals from microphones in the "off" state. In this manner, the telephone line does not appear dead to a listener on the other end of the telephone line when speech is not present in the telephone input signal. A noise reduction filter filters the raw telephone signal in the time domain in real time to improve the clarity of the telephone input signal when speech is present in the telephone input signal. A microphone steering switch for the voice enhancement system is also provided to implement switching between acoustically coupled microphones located within the vehicle.

25 Claims, 11 Drawing Sheets

U.S. PATENT DOCUMENTS 5,664,019 A * 9/1997 Wang et al. .................. 381/66
5,680,450 A * 10/1997 Dent et al. .................. 379/388
5,706,344 A 1/1998 Finn ........................... 379/410
5,796,819 A * 8/1998 Romesburg ................. 379/406
5,974,332 A * 10/1999 Chung ........................ 455/566
5,978,689 A * 11/1999 Tuoriniemi et al. ......... 455/569
6,014,573 A * 1/2000 Lehtonen et al. ........... 455/569
6,131,042 A * 10/2000 Lee et al. ................... 455/556

* cited by examiner

INTEGRATED VEHICLE VOICE ENHANCEMENT SYSTEM AND HANDS-FREE CELLULAR TELEPHONE SYSTEM

FIELD OF THE INVENTION

The invention relates to vehicle voice enhancement systems and hands-free cellular telephone systems using microphones mounted throughout a vehicle to sense driver and/or passenger speech. In particular, the invention relates to improvements in the selection of transmitted microphone signals and noise reduction filtering.

BACKGROUND OF THE INVENTION

A vehicle voice enhancement system uses intercom systems to facilitate conversations of passengers sitting within different zones of a vehicle. A single channel voice enhancement system has a near-end zone and a far-end zone with one speaking location in each zone. A near-end microphone senses speech in the near-end zone and transmits a voice signal to a far-end loudspeaker. The far-end loudspeaker outputs the voice signal into the far-end zone, thereby enhancing the ability of a driver and/or passenger in the far-end zone to listen to speech occurring in the near-end zone even though there may be substantial background noise within the vehicle. Likewise, a far-end microphone senses speech in the far-end zone and transmits a voice signal to a near-end loudspeaker that outputs the voice signal into the near-end zone. Voice enhancement systems not only amplify the voice signal, but also bring an acoustic source of the voice signal closer to the listener.

Microphones are typically mounted within the vehicle near the usual speaking locations, such as on the ceiling of the vehicle passenger compartment above the seats or on seat belt shoulder harnesses. Inasmuch as microphones are present when implementing a vehicle voice enhancement system, it is desirable to use the voice enhancement system microphones in combination with a cellular telephone system to provide a hands-free cellular telephone system within the vehicle.

It is important that an integrated voice enhancement system and hands-free cellular telephone system be able to transmit clear intelligible voice signals. This can be difficult in a vehicle because significant acoustic changes can occur quickly within the passenger compartment of the vehicle. For instance, background noise can change substantially depending on the environment around the vehicle, the speed of the vehicle, etc. Also, the acoustic plant within the passenger compartment can change substantially depending upon temperature within the vehicle and/or the number of passengers within the vehicle, etc. Adaptive acoustic echo cancellation as disclosed in U.S. Pat. Nos. 5,033,082 and 5,602,928 and pending U.S. patent application Ser. No. 08/626,208, can be used to effectively model various acoustic characteristics within the passenger compartment to remove annoying echoes. However, even after annoying echoes are removed, background noise within the vehicle passenger compartment can distort voice signals. Further, microphone switching can create unnatural speech patterns and annoying clicking noises.

Providing intelligible and natural sounding voice signals is important for voice enhancement systems, and is also important for hands-free cellular telephone systems. However, providing intelligible and natural sounding voice signals is typically more difficult for cellular telephone systems. This is because a listener on the other end of the line must be able to not only clearly hear speech from the vehicle but also must be able to easily detect whether the cellular telephone is on-line. That is, the line must not appear dead to the listeners when no speech is present in the vehicle. Also, the listener on the other end of the line is typically in a quiet environment and the presence of background vehicle noises during speech is annoying.

SUMMARY OF THE INVENTION

The invention is an integrated vehicle voice enhancement system and hands-free cellular telephone system that implements a voice activated microphone steering technique to provide intelligible and natural sounding voice signals for both the voice enhancement aspects of the system and the hands-free cellular telephone aspects of the system. This invention arose during continuing development efforts relating to the subject matter of U.S. Pat. Nos. 5,033,082; 5,602,928; 5,172,416; and copending U.S. patent application Ser. No. 08/626,208 entitled "Acoustic Echo Cancellation In An Integrated Audio and Telecommunication Intercom System"), all incorporated herein by reference. The invention applies to both single channel (SISO) and multiple channel (MIMO) systems.

In one aspect, the invention involves the use of a microphone steering switch that inputs echo-cancelled voice signals from the microphones within the vehicle and outputs a raw telephone input signal. Each of the microphones in the system has the capability of switching between an "off" state and an "on" state. The microphones are voice activated such that a respective microphone can switch into the "on" state only when the sound level in the microphone signal (e.g. dB) exceeds a threshold switching value, thus indicating that speech is present in a speaking location near the microphone. The microphone steering switch outputs a raw telephone input signal which is preferably a combination of 100% of the microphone output from the microphone in the "on" state, and preferably approximately 20% of the microphone output from the microphone(s) in the "off" state. In order for the telephone input signal to be intelligible by a person on the other end of the cellular telephone line, the invention allows only one of the microphones to be designated as the primary microphone (i.e. switched to the "on" state) at any given time.

The invention implements microphone steering techniques for the designation of primary microphone signals into the "on" state so that no two microphones are switched into the "on" state at the same time. Yet, microphone output between the "on" and "off" states fades out and cross-fades between microphones in a manner that is not annoying to the driver and/or passengers within the vehicle or a person on the other end of the cellular telephone line.

When generating the raw telephone input signal, it is desirable that a rather high percentage of the microphone output for the microphones in the "off" state, for example approximately 20%, be transmitted so that the cellular telephone line does not appear dead to a person on the other end of the telephone line when speech is not present within the vehicle.

In a second aspect, the invention applies noise reduction filters to filter out the background vehicle noise in the system microphone signals. In a microphone steering context, it is designed to remove the noise in the signals corresponding to the microphone(s) in the "on" state. The noise reduction filters are important for three primary reasons:

1. They generate a noise-reduced telephone input signal having improved clarity. By properly steering and switching the microphone signals, an intelligible raw telephone input signal is derived from the set of system microphone signals. However, this signal also contains a relatively large amount of background noise which in many cases severely degrades the quality of the speech signal, especially to a listener in a quiet environment on the other end of the line.

2. They reduce the background noise that is rebroadcasted to the system loudspeakers in both SISO and MIMO voice enhancement systems. The rebroadcast of the background noise is very perceivable in situations where the noise characteristics spatially vary within the vehicle. This is common in large vehicles where the amount of wind noise (i.e. open/closed window or sunroof), HVAC/fan noise, road noise, etc. vary depending on the passenger's position in the vehicle.
3. For vehicles employing voice recognition systems (for example, those that are used to interpret hands-free cellular phone commands), the background noise on the microphone signal(s) can severely degrade the performance of such systems. The noise reduction filter(s) reduce the background noise and therefore improve the performance of the voice recognition.

In its most general state, the noise reduction filters are applied to each of the microphone signals after the echo has been subtracted. However, if processing power is limited on the electronic controller, a single noise reduction filter can be applied to the microphone steering switch output to remove the background noise in the outgoing cell phone signal.

The preferred noise reduction filter includes a bank of fixed filters, preferably spanning the audible frequency spectrum, and a time-varying filter gain element $\beta_m$ corresponding to each fixed filter. The raw input signal inputs each of the fixed filters, and the output of each fixed filter $z_m(k)$ is weighted by the respective time-varying filter gain element $\beta_m$. A summer combines the weighted and filtered input signals and outputs a noise-reduced input signal. The preferred noise reduction filters process the raw input signal in real time in the time domains. Therefore, the need for inverse transforms which are computationally burdensome is eliminated. The time-varying filter gain elements are preferably adjusted in accordance with a speech strength level for the output of each respective fixed filter. In this manner, the noise reduction filter tracks the sound characteristics of speech present in the raw input signal over time, and gives emphasis to bands containing speech, while at the same time fading out background noise occurring within bands in which speech is not present. However, if no speech at all is present in the raw input signal, the noise reduction filter will allow sufficient signal to pass therethrough so that the cellular telephone line does not appear dead to someone on the other end of the line.

The preferred transform is a recursive implementation of a discrete cosine transform modified to stabilize its performance on digital signal processors. The preferred transform (i.e. Equations 1 and 2) has several important properties that make it attractive for this invention. First, the preferred transform is a completely real valued transform and therefore does not introduce complex arithmetic into the calculations as with the discrete Fourier transform (DFT). This reduces both the complexity and the storage requirements. Second, this transform can be efficiently implemented in a recursive fashion using an IIR filter representation. This implementation is very efficient which is extremely important for voice enhancement systems where the electronic controllers are burdened with the other echo-cancellation tasks.

It should be noted that the preferred transform (i.e. Equations 1 and 2) has two major advancements over the traditional recursive-type of transforms mentioned in the literature. Traditional recursive-type of transforms, including the "sliding" DFT transform, often suffer from filter instability problems. This instability is the result of round-off errors which arise when the filter parameters are implemented in the finite precision environment of a digital signal processor (DSP). More precisely, the instability is due to non-exact cancellation of the "marginally" stable poles of the filter which is caused by the parameter round-off errors. The preferred transform presented here is designed to overcome these problems by modifying the filter parameters according to a $\gamma$ factor. This stabilizes the filter and is well suited for a variety of hardware systems since $\gamma$ can be adjusted to accommodate different fixed or floating-point digital signal processors. Another advancement of the preferred transform over the conventional transforms is that each of the filters in the preferred transform is appropriately scaled such that the summation of all of the filter outputs, $z_m(k)$: m=0 . . . M-1, at any instant in time equals the input at that instant in time. Thus, the combining of the outputs acts as an inverse transform. Therefore, an explicit inverse transform is not required. This further increases the efficiency of the transformation.

The time-varying gain elements, $\beta_m$ applied to the filtered input signals also have several major improvements over the existing approaches. It should be noted that the performance of the system lies solely in the proper calculation of the gain elements $\beta_m$ since with unity gain elements the system output is equal to the input signal resulting in no noise reduction. Existing techniques often suffer from poor speech quality. This results from the filter's inability to adjust to rapidly varying speech giving the processed speech a "choppy" sound characteristics. The approach taken here overcomes this problem by adjusting the time-varying gain elements $\beta_m$ in a frequency-dependent manner to ensure a fast overall dynamic response of the system. The $\beta_m$ gains corresponding to high frequency bands are determined according to speech strength level computed from a relatively small number of filter output samples, $z_m(k)$, since high frequency signals vary quickly with time and therefore fewer outputs are needed to accurately estimate the output power. On the other hand, the $\beta_m$ gains corresponding to low frequency bands are computed from a larger number of filter output samples in order to accurately measure the power of low frequency signals which are slowly time-varying. By determining the $\beta_m$ gains in this frequency band-dependent fashion, each band in the filter is optimized to provide the fastest temporal response while maintaining accurate power estimates. If the system $\beta_m$ gains for the bands were determined in the same manner or by using the same formula, as is common in existing methods, the dynamic response of the high frequency bands would be compromised to achieve accurate low power estimates. Furthermore, this approach uses a closed-form expression for the $\beta_m$ gain based on the speech strength levels in each band, and therefore does not require a table of gain elements to be stored in memory. This expression also has been derived such that when speech levels are low in a particular frequency band, the $\beta_m$ gain of the band is not set to zero, but some low level value. This is important so that the cell phone input does not appear "dead" to the listener at the other end of the line, and it also significantly reduces signal "flutter".

In another aspect, the invention implements microphone steering switches for multiple channel voice enhancement systems. For instance, such a MIMO voice enhancement system typically has two or more microphones in a near-end acoustic zone and two or more microphones in a far-end acoustic zone. While the microphones in the near-end zone are typically not acoustically coupled to the microphones in the far-end zone, microphones within the near-end zone may be acoustically coupled to one another and microphones within the far-end zone may be acoustically coupled to one another. In implementing the MIMO voice enhancement system, it is desirable that only one of the microphones in the near-end zone be designated as a primary microphone (i.e. switched into the "on" state) at any given time in order for the transmitted input signal to the far-end zone to be intelligible. This is important not only when two or more passengers within the vehicle are speaking, but also to prevent acoustic spill over from one speaking location in the near-end zone to another speaking location in the near-end zone which could cause microphone falsing. Preferably, a similar steering switch is provided to generate a transmitted near-end input signal from the far-end microphone signals. In implementing the steering switches for the voice enhancement system, it is preferred that microphones in the "off" state contribute a small percentage of the microphone output, such as 5%–10% or less, so that transmission of background noise through the voice enhancement system is not noticeable by the driver and/or passengers within the vehicle. It is desirable that a small undetectable percentage of the microphone output be contributed to the respective input signal to prevent annoying microphone clicking that would occur if the microphone switches electrically between being on and being completely off.

DETAILED DESCRIPTION OF THE DRAWINGS

Figure 1:
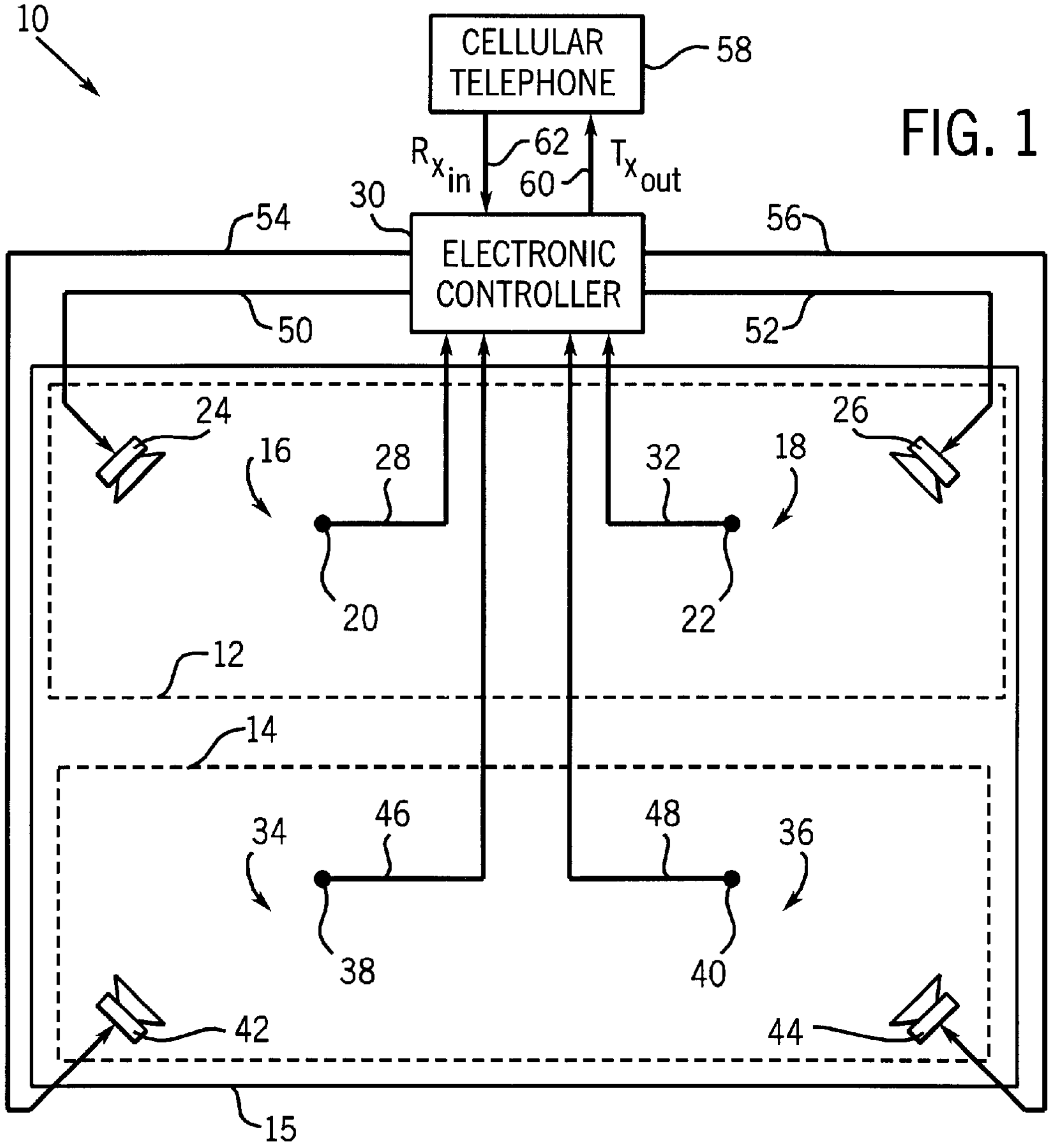
FIG. 1 is a schematic illustration of an integrated vehicle voice enhancement system and hands-free cellular telephone system.

FIG. 1 illustrates an integrated vehicle voice enhancement system and hands-free cellular telephone system 10 in accordance with the invention. The system 10 has a near-end zone 12 and a far-end zone 14, both residing within a vehicle 15. Each zone 12 and 14 may be subject to substantial background noises. Thus, a passenger in the vehicle seated in the far-end zone 14 may have difficulty hearing a passenger and/or driver located in the near-end zone 12 without the use of a vehicle voice enhancement system, or vice-versa. In addition to implementing a voice enhancement system, it may be desirable to use active sound control or the like to reduce background noises within the vehicle 15.

In FIG. 1, the near-end zone 12 includes two speaking locations 16 and 18, respectively. A first near-end microphone 20 senses noise and speech at speaking location 16. A second near-end microphone 22 senses noise and speech at speaking location 18. A first near-end loudspeaker 24 introduces sound into the near-end zone 12 at speaking location 16. A second near-end loudspeaker 26 introduces sound into the near-end zone 12 at speaking location 18. It is preferred that the first near-end microphone 20 be located in close proximity to the first speaking location 16 in the near-end acoustic zone 12, such as on the ceiling of the vehicle 15 directly above the speaking location 16 or on a seat belt worn by a driver or passenger located in speaking location 16. Likewise, it is preferred that the second near-end microphone 22 be located in close proximity to the second near-end speaking location 18 in the near-end acoustic zone 12. Because of the close proximity between speaking locations 16 and 18, the microphones 20 and 22 in the near-end zone will typically be coupled acoustically. For instance, sound present at speaking location 16 in the near-end zone 12 is detected primarily by the first microphone 20 but can also be detected to some extent by the second microphone 22 in the near-end zone 12, and vice-versa. The first near-end microphone 20 generates a first near-end voice signal that is transmitted through line 28 to an electronic controller 30. Likewise, the second near-end microphone 22 generates a second near-end voice signal that is transmitted through line 32 to the electronic controller 30.

The far-end zone 14 in the vehicle 15 includes a first speaking location 34 and a second speaking location 36. A first far-end microphone 38 senses noise and speech at speaking location 34. A second far-end microphone 40 senses noise and speech at speaking location 36. A first far-end loudspeaker 42 introduces sound into the far-end zone 14 at speaking location 34. A second far-end loudspeaker 44 introduces sound into the far-end zone 14 at speaking location 36. The first far-end microphone 38 generates a first far-end voice signal in response to noise and speech present at speaking location 34. The second far-end voice signal is transmitted through line 46 to the electronic controller 30. The second far-end microphone 40 generates a second far-end voice signal in response to noise and speech present at speaking location 36. The second far-end voice signal is transmitted through line 48 to the electronic controller 30. It is preferred that the first far-end microphone 38 be located in close proximity to the first far-end speaking location 34 in the far-end acoustic zone. Likewise, it is preferred that the second far-end microphone 40 be located in close proximity to the second far-end speaking location 36 in the far-end zone 14. The first far-end microphone 38 and the second far-end microphone 40 are acoustically coupled inasmuch as speech present at speaking location 34 is sensed primarily by the first far-end microphone 38 but is also sensed to some extent by the second far-end microphone 40, and vice-versa.

The electronic controller 30 outputs a first near-end input signal in line 50 that is transmitted to the first near-end loudspeaker 24. The electronic controller 30 also outputs a second near-end input signal that is transmitted through line 52 to the second near-end loudspeaker 26. In addition, the electronic controller outputs a first far-end input signal that is transmitted through line 54 to the first far-end loudspeaker 42. The electronic controller also outputs a second far-end input signal that is transmitted through line 56 to the second far-end loudspeaker 44.

As described thus far, the system 10 can be used to provide voice enhancement and facilitate conversation between a passenger or driver seated in the near-end zone 12 and a passenger seated in the far-end zone 14, or vice-versa. FIG. 1 also shows a cellular telephone 58 integrated into the system 10. The electronic controller 30 outputs a telephone input signal $Tx_{out}$ that is transmitted through line 60 to the cellular telephone 58. The electronic controller 30 also receives a telephone receive signal $Rx_{in}$ from the cellular telephone through line 62. In this manner, the electronic controller 30 communicates with the cellular telephone 58 to provide for a hands-free cellular telephone system within the vehicle 16.

Figure 2A:
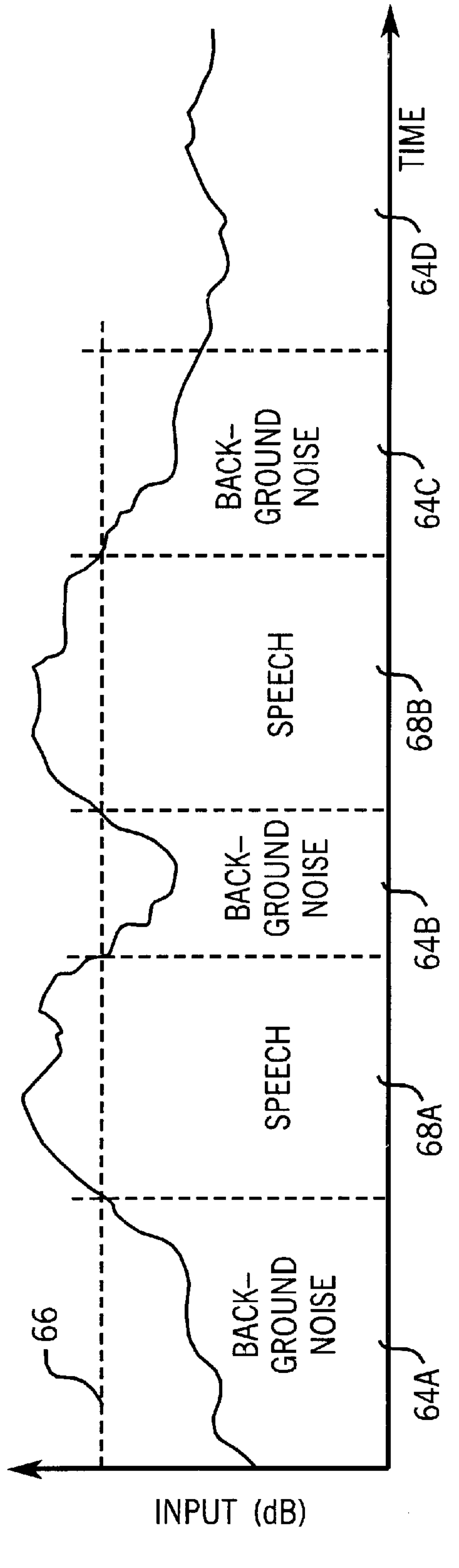
FIGS. 2A and 2B are graphs illustrating voice activated switching in accordance with the invention.
Figure 2B:
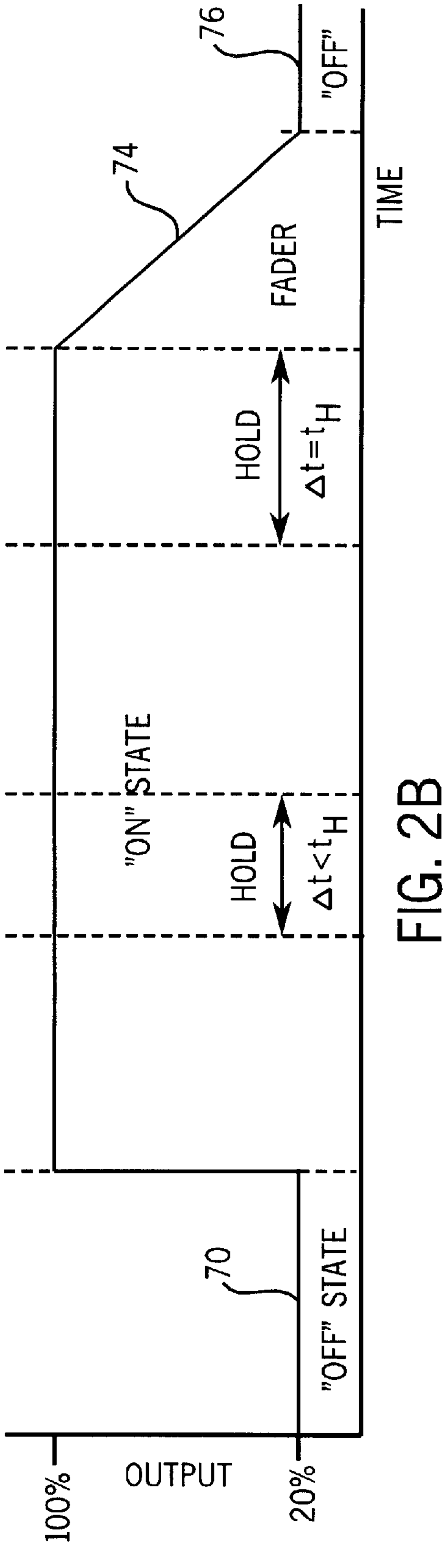

FIGS. 2A and 2B explain voice activated switching as preferably implemented for both the near-end microphones 20 and 22 and the far-end microphones 38 and 40. FIG. 2A illustrates microphone input in terms of sound level (dB), and FIG. 2B illustrates voice activated switching of microphone output between an “off” state and an “on” state in relation to the microphone input shown in FIG. 2A. Microphone input sound level (dB) is preferably determined using a short-time, average magnitude estimating function to detect whether speech is present. Other suitable estimating functions are disclosed in *Digital Processing of Speech Signals,* Lawrence R. Raviner, Ronald W. Schafer, 1978, Bell Laboratories, Inc., Prentice Hall, pages 120–126. While each microphone 20, 22, 38 and 40 transmits a full signal to the electronic controller 30, the electronic controller 30 includes a gate/switch that reduces the transmission of a respective microphone signal at least when the sound level for the signal does not exceed the threshold switching value. FIG. 2A illustrates that background noise present within the vehicle, time periods 64A, 64B, 64C and 64D, generally has a sound level less than a threshold switching value depicted by dashed line 66. On the other hand, speech present during time periods 68A and 68B generally has a sound level exceeding the threshold switching value 66. Microphone output remains in an “off” state before speech is sensed by a respective microphone. Microphone output switches into an “on” state once speech is present in a speaking location associated with the microphone, given that no other microphones are switched into an “on” state. FIG. 2B shows microphone output initially in an “off” state, reference 70, which corresponds to time period 64A in FIG. 2A in which only background noise is present in the microphone signal. Note that in the “off” state 70, microphone output is preferably set to approximately 20% of the microphone output in the “on” state. FIG. 2B shows microphone output switching to an “on” state 72 when speech is present and microphone input exceeds the threshold switching value 66, region 68A in FIG. 2A. Microphone input sound level (dB) is preferably measured in approximately 12 millisecond windows, thus a microphone can be switched into the “on” state at a rate faster than is perceptible during normal conversation.

FIG. 2B further illustrates that microphone output remains in an “on” state even if the microphone input sound level falls below the threshold switching value 66 for a relatively short amount of time. That is, microphone output holds in an “on” state for at least a holding time period $t_H$, which is preferably equal to approximately one second. Once the microphone input sound level drops below the threshold switching value 66 for more than the holding time period $t_H$, the microphone output fades 74 from the “on” state 72 to the “off” state 76. It is desirable that microphone output when the microphone is in the “off” state be greatly reduced, e.g. approximately 20% or less for cellular telephone transmission and approximately 1%–10% for voice enhancement transmission, but not completely eliminated. If microphone output is completely eliminated when the microphone is in the “off” state, annoying microphone clicking will occur, and the line will appear dead when the microphone is in the “off” state. Providing a low-level of microphone output when the microphone is in the “off” state facilitates natural sounding voice enhancement and practical telephone signal transmission.

When generating the telephone input signal $Tx_{out}$ for the cellular telephone 58, it is desirable that no more than one of the microphones 20, 22, 38 or 40 be switched into the “on” state at any given time. This facilitates intelligibility of the transmitted cellular telephone signal to a listener on the other end of the line when two or more persons in the vehicle 15 are competing, and also prevents acoustic spill over between acoustically coupled microphones such as microphones 20 and 22 or 38 and 40. Although it is desirable that microphone output remain at a low level when a microphone is switched in an “off” state (e.g. approximately 20%), the presence of several microphones in a system can create distortion, which is especially problematic for the single telephone input signal $Tx_{out}$ transmitted to the cellular telephone 58. The background noise that is present on the signal corresponding to the microphone in the “on” state is also problematic for $Tx_{out}$, since the listener on the other end of the line is typically in a quiet environment making such noise objectionable. Thus, it is preferred that the telephone input signal $Tx_{out}$ be filtered to remove the background noise before transmission of the signal to the cellular telephone 58.

Figure 3A:
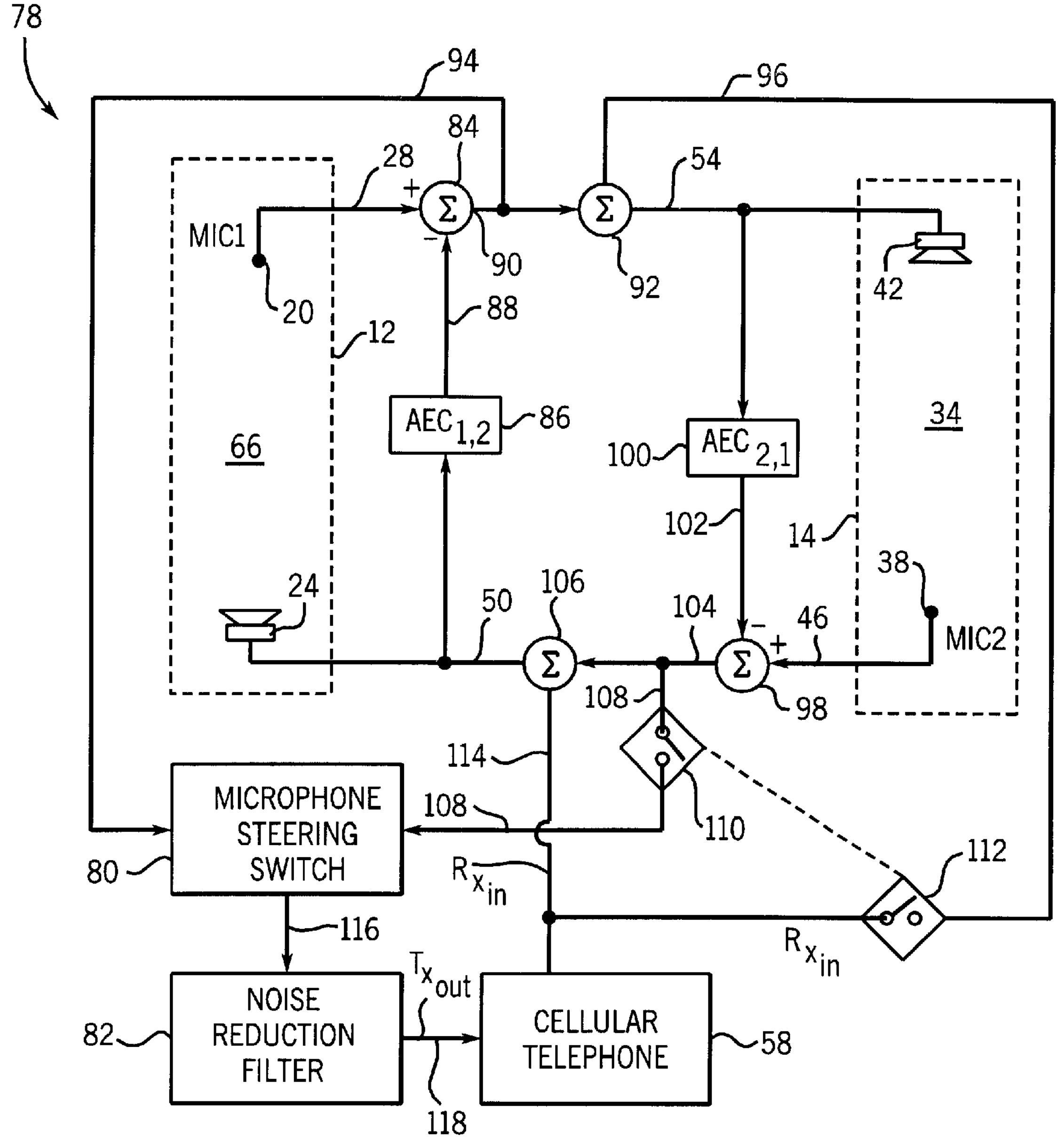
FIG. 3A is a block diagram illustrating the operation of an integrated single channel vehicle voice enhancement system and hands-free cellular telephone system in accordance with the invention, which uses a single noise reduction filter.

FIG. 3A illustrates a single channel (SISO) integrated voice enhancement system and hands-free cellular telephone system 78 that includes a microphone steering switch 80 and a noise-reduction filter 82 for the telephone input signal $Tx_{out}$. In many respects, the SISO system 78 shown in FIG. 3A is similar to the system 10 shown in FIG. 1 and like reference numerals are used where appropriate to facilitate understanding. In FIG. 3A, the near-end microphone 20 senses sound in the near-end zone 12 and generates a near-end voice signal that is transmitted through line 28 to a near-end echo cancellation summer 84. A near-end adaptive acoustic echo canceller 86 inputs the near-end input signal from line 50. The near-end adaptive echo canceller 86 outputs a near-end echo cancellation signal in line 88 that inputs the near-end echo cancellation summer 84. The near-end acoustic echo canceller 86 is preferably an adaptive finite impulse response filter having sufficient tap length to model the acoustic path between the near-end loudspeaker 24 and the output of the near-end microphone 20. The near-end acoustic echo canceller 86 is preferably adapted using an LMS update or the like, preferably in accordance with the techniques disclosed in copending patent application Ser. No. 08/626,208, entitled "Acoustic Echo Cancellation In An Integrated Audio And Telecommunication Intercom System", by Brian M. Finn, filed on Mar. 29, 1996, now U.S. Pat. No. 5,706,344 issued on Jan. 6, 1998. The near-end echo cancellation summer 84 subtracts the near-end echo cancellation signal in line 88 from the near-end voice signal in line 28, and outputs an echo-cancelled, near-end voice signal in line 90. The near-end echo cancellation summer 84 thus subtracts from the near-end voice signal in line 28 that portion of the signal due to sound introduced by the near-end loudspeaker 24.

The echo-cancelled, near-end voice signal in line 90 is transmitted both to a far-end input summer 92 and through line 94 to the microphone steering switch 80. The far-end input signal 92 also receives components of the far-end input signal other than the echo-cancelled near-end voice signal, such as a cellular telephone receive signal $Rx_{in}$ from line 96 or an audio feed (not shown), etc. The far-end input summer 92 outputs the far-end input signal in line 54 which drives the far-end loudspeaker 42.

The far-end microphone 38 senses sound in the far-end zone 14 at speaking location 34 and generates a far-end voice signal that is transmitted through line 46 to a far-end echo cancellation summer 98. A far-end adaptive acoustic echo canceller 100, preferably identical to the near-end adaptive acoustic echo canceller 86, receives the far-end input signal in line 54 and outputs a far-end echo cancellation signal in line 102. The far-end echo cancellation signal in line 102 inputs the far-end echo cancellation summer 98. The far-end echo cancellation summer 98 subtracts the near-end echo cancellation signal in line 102 from the far-end voice signal in line 46 and outputs an echo-cancelled, far-end voice signal in line 104. The far-end echo cancellation summer 98 thus subtracts from the far-end voice signal in line 46 that portion of the signal due to sound introduced by the far-end loudspeaker 42. The echo-cancelled, far-end voice signal in line 104 is transmitted to both a near-end input summer 106, and to the microphone steering switch 80 through line 108. A privacy switch 110 is located in line 108, thus allowing a passenger or driver within the vehicle to discontinue transmission of the far-end echo-cancelled voice signal to the microphone steering switch 80 by opening the privacy switch 110. A similar privacy switch 112 is located in line 96 between the cellular telephone 58 and the far-end input summer 92 which enables a driver and/or passenger within the vehicle to discontinue transmission of the telephone receive signal $Rx_{in}$ from the cellular telephone 58 to the far-end loudspeaker 42 in the far-end zone 14.

The near-end input summer 106 also receives other components of the near-end input signal, such as the cellular telephone receive signal $Rx_{in}$ in line 114 or an audio feed (not shown), etc. The near-end input summer 106 outputs the near-end input signal in line 50 which drives the near-end loudspeaker 20.

Assuming that privacy switch 110 in line 108 is closed, the microphone steering switch 80 receives both the echo-cancelled near-end voice signal through line 94 and the echo-cancelled far-end voice signal through line 108. The microphone steering switch 80 combines and/or mixes the echo-cancelled voice signals preferably in the manner described with respect to FIGS. 4–7, and outputs a raw telephone input signal in line 116. In accordance with the invention, the raw telephone input signal 116 inputs the noise reduction filter 82. The noise reduction filter 82 outputs a noise-reduced telephone input signal $Tx_{out}$ that inputs the cellular telephone 58.

Figure 3B:
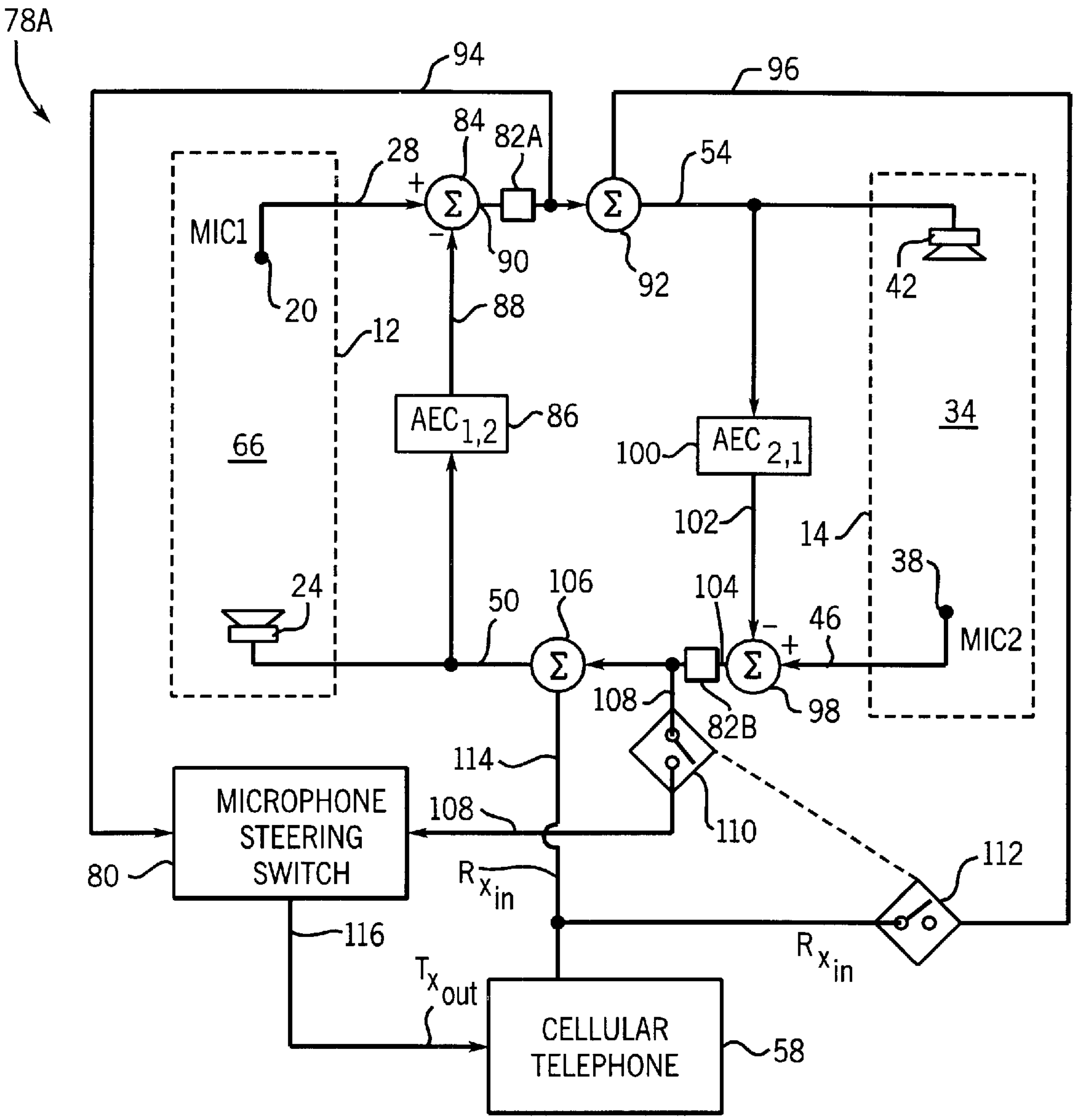
FIG. 3B is a block diagram illustrating the operation of an integrated single channel vehicle voice enhancement system and hands-free cellular telephone system in accordance with the invention, which uses a plurality of noise reduction filters.

FIG. 3B illustrates a single channel (SISO) integrated voice enhancement system and hands-free cellular telephone system 78*a* which is similar to the system 78 shown in FIG. 3A. The primary difference in the system 78*a* in FIG. 3B is that the single noise reduction filter 82 in the system 78 shown in FIG. 3A has been replaced by a plurality of noise reduction filters 82*a*, 82*b*. Noise reduction filter 82*a* is located in the near-end voice signal line 90. Noise reduction filter 82*b* is located in the far-end voice signal line 104. In addition to improving the clarity of the telephone input signal, $Tx_{out}$, this implementation also removes the background noise in the voice signal themselves. Noise reduction filter 82*a* removes the background noise in the near-end voice line 90 and therefore prevents the rebroadcasting of this noise on the far-end loudspeaker 42. Likewise, noise reduction filter 82*b* removes the background noise in the far-end voice line 104 and therefore prevents the rebroadcasting of this noise on the near-end loudspeaker 24. In other respects, the system 78*a* shown in FIG. 3B is similar to the system 78 shown in FIG. 3A.

Figure 4:
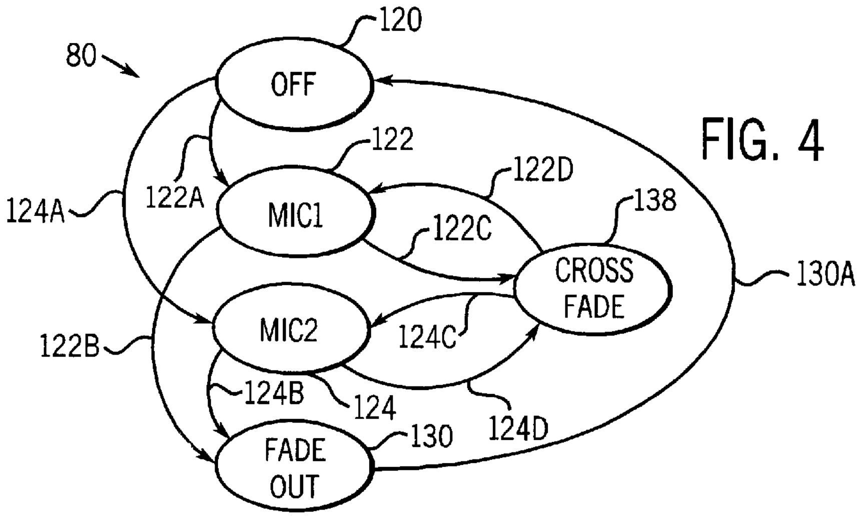
FIG. 4 is a state diagram illustrating a preferred microphone steering technique.
Figure 5:
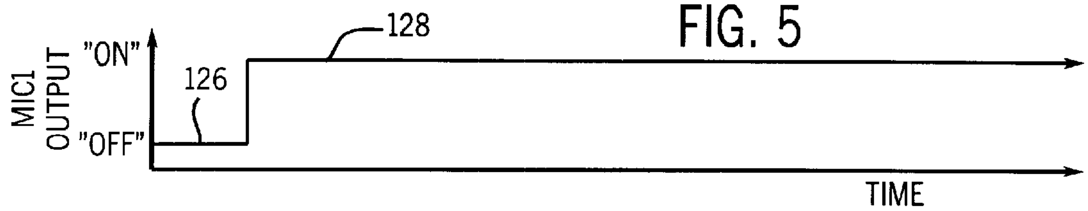
FIG. 5 is a plot illustrating the designation of one of the microphones in the system as a primary microphone, thus switching the designated primary microphone from an "off" state to an "on" state.

FIGS. 4–7 illustrate the preferred microphone steering technique for the cellular telephone input signal which is implemented by the microphone steering switch 80. FIG. 4 is a state diagram for voice activated switching between the near-end microphone 20 labelled MIC 1 and the far-end microphone 38 labelled MIC 2. As shown in the state diagram of FIG. 4, only one of the microphones 20, 38 can be switched into the "on" state at any given time. The idle state 120 indicates a state in which both microphones 20, 38 are in an "off" state. From the idle state 120, it is possible for either the near-end microphone 20, MIC 1, to switch into an "on" state 122 or for the far-end microphone 38, MIC 2, to switch into an "on" state 124. Arrows 122A and 124A from the idle state 120 illustrate that it is not possible for both of the microphones 20 and 38 to be in the "on" state contemporaneously. FIG. 5 graphically depicts switching near-end microphone 20 output, MIC 1, into an "on" state 122 when the system is initially in the idle state 120. More specifically, the near-end microphone 20, MIC 1, senses background noise and speech within the vehicle and generates a respective microphone signal in response thereto. The magnitude of the microphone signal is determined in accordance with the voice activated switching technique illustrated in FIGS. 2A and 2B. Microphone output for the microphone 20, MIC 1, is maintained in the "off" state if the magnitude of the microphone signal is below the threshold switching value 66. However, if initially the system is in the idle state 120 (i.e. the sound level for both the near-end microphone 20, MIC 1, and the far-end microphone 38, MIC 2, have remained below the threshold switching value 66), the first microphone having a microphone signal with a magnitude exceeding the threshold switching value 66 switches to the "on" state. FIG. 5 shows the near-end microphone 20 output switching from an "off" state 126 to an "on" state 128. The microphone selected to be in the "on" state is referred herein as the designated primary microphone. The raw telephone input signal in line 116 from the microphone steering switch 80 is preferably a combination of the full echo-cancelled voice signal from the primary microphone and approximately 20% of the echo-cancelled voice signal from the other microphone.

Figure 7:
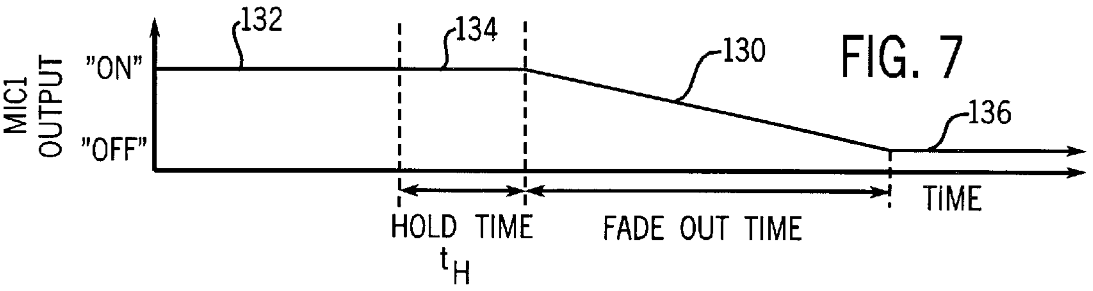
FIG. 7 is a plot illustrating fade-out of a primary microphone from an "on" state to an "off" state.

Whenever either the near-end microphone 20, MIC 1, or the far-end microphone 38, MIC 2, are designated as the primary microphone (i.e., the microphone output is switched to an "on" state), the microphone holds in the "on" state even after the sound level of the microphone signal falls below the threshold switching value 66 for the holding time period $t_H$. However, after the holding time period $t_H$ expires, the microphone output for the primary microphone enters a fade-out state 130, FIG. 4, as long as the sound level for the other microphone does not exceed the threshold switching value 66. In FIG. 4, lines 122B and 124B illustrate respective microphones MIC 1 and MIC 2 entering the fade-out state 130. Line 130A illustrates that after the microphone completes the fade-out state 130, the system enters the idle state 120. FIG. 7 graphically depicts the switching action for the near-end microphone 20 output through the fade-out state 130. Microphone output begins in the "on" state 132, and holds in the "on" state for the holding time period 134 even after the sound level for the microphone 20 signal falls below the threshold switching value 66. When the holding time period $t_H$ expires, the microphone 20 output enters the fade-out state 130 in which the microphone output fades from the "on" state 134 to the "off" state 136. The preferred fade-out time period $t_H$ is approximately three seconds.

Figure 6A:
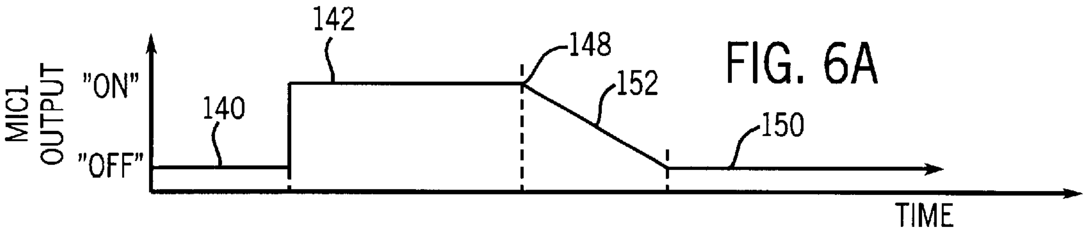
FIGS. 6A and 6B are plots illustrating cross-fading from a first primary microphone to a second primary microphone.
Figure 6B:
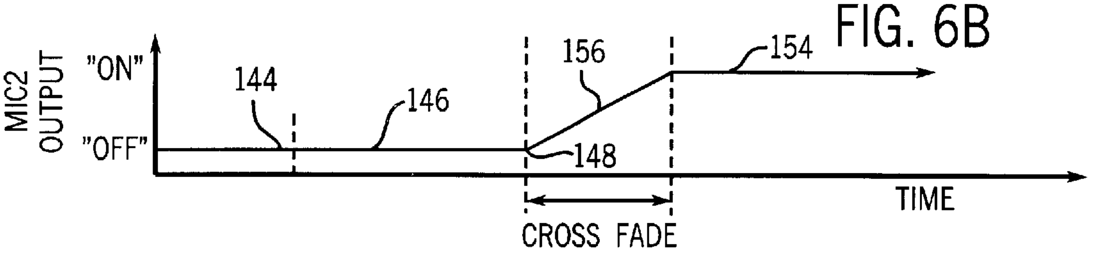

When the near-end microphone 20, MIC 1, is designated as the primary microphone, state 122, or the far-end microphone 38, MIC 2, is designated as the primary microphone, state 124, and the sound level of the other microphone exceeds the threshold switching value 166, it may be desirable under some circumstances to cross-fade between the microphones as illustrated by cross-fade state 138, FIG. 4. Line 122C pointing towards the cross-fade state 138 illustrates the near-end microphone 20, MIC 1, as the designated primary microphone, cross-fading from the "on" state 122 to the "off" state. Line 124C from the cross-fade state 138 illustrates that the far-end microphone 38, MIC 2, contemporaneously fades on from the "off" state to the "on" state 124 to become the designated primary microphone. FIGS. 6A and 6B graphically depict the switching action for the cross-fading state 138 illustrated by lines 122C and 124C and cross-fading state 138. FIG. 6A shows the near-end microphone 20, MIC 1, switching from the "off" state 140 to the "on" state 142 as in accordance with line 122A and state 122 in FIG. 4, thus designating the near-end microphone 20, MIC 1, as the primary microphone. During the same time period, the far-end microphone 38, MIC 2, remains in the "off" state, reference numeral 144 and 146 in FIG. 6B. If the sound level for the far-end microphone 38, MIC 2, exceeds the threshold switching value 66 after the near-end microphone 20, MIC 1, has been designated as the primary microphone (i.e. the sound level for the far-end microphone 38, MIC 2, exceeds the threshold switching value 166 during the time period designated by reference numeral 146 in FIG. 6B), the far-end microphone 38, MIC 2, is designated as a priority requesting microphone. The designated priority requesting microphone requests priority to become the designated primary microphone, but does not enter the "on" state until the designated primary microphone relinquishes priority, even though the sound level for the priority requesting microphone exceeds the threshold switching value 66. In other words, the designated priority switching microphone cannot become the designated primary microphone until the designated primary microphone relinquishes priority. At the instant that the designated primary microphone relinquishes priority, reference numeral 148 in FIGS. 6A and 6B, the designated primary microphone (near-end microphone 20, MIC 1, in FIG. 6A) fades out from the "on" state 142 to the "off" state 150, as indicated by reference numeral 152 in FIG. 6A, and the far-end microphone 38, MIC 2, contemporaneously cross-fades on from the "off" state 146 to the "on" state 154 as illustrated by reference numeral 156. The designated primary microphone (i.e. the near-end microphone 20, MIC 1 in FIG. 6A) relinquishes priority if the holding time period $t_H$ expires while the priority requesting microphone (i.e. the far-end microphone 38, MIC 2 in FIG. 6B), is requesting priority (i.e. the sound level of the echo-cancelled, far-end voice signal in line 108, FIG. 3, exceeds the threshold switching value 166). In addition, it is preferred in some circumstances that the designated primary microphone relinquish priority even before the expiration of the holding time period $t_H$ if statistically it is determined that the sound level for the priority requesting microphone is sufficiently high compared to the sound level for the designated primary microphone. For instance, it may be desirable for the designated primary microphone to relinquish priority when the sound level for the priority requesting microphone exceeds the sound level for the designated priority microphone on a time-averaged basis by 50% for at least one second.

In FIG. 4, line 124D pointing towards the cross-fade state 138 illustrates that the far-end microphone 38, MIC 2, cross-fades from the "on" state to the "off" state. Line 122D from the cross-fade state 138 illustrates that contemporaneously the near-end microphone 20, MIC 1, cross-fades on from the "off" state to the "on" state. Cross-fading from the far-end microphone 38, MIC 2, as the designated primary microphone, state 124, to the near-end microphone 20, MIC 1, as the designated primary microphone, state 122, is accomplished in the same manner as shown in FIGS. 6A and 6B and as described above with respect to a cross-fade from the near-end microphone 20, MIC 1, to the far-end microphone 38, MIC 2.

Figure 8A:
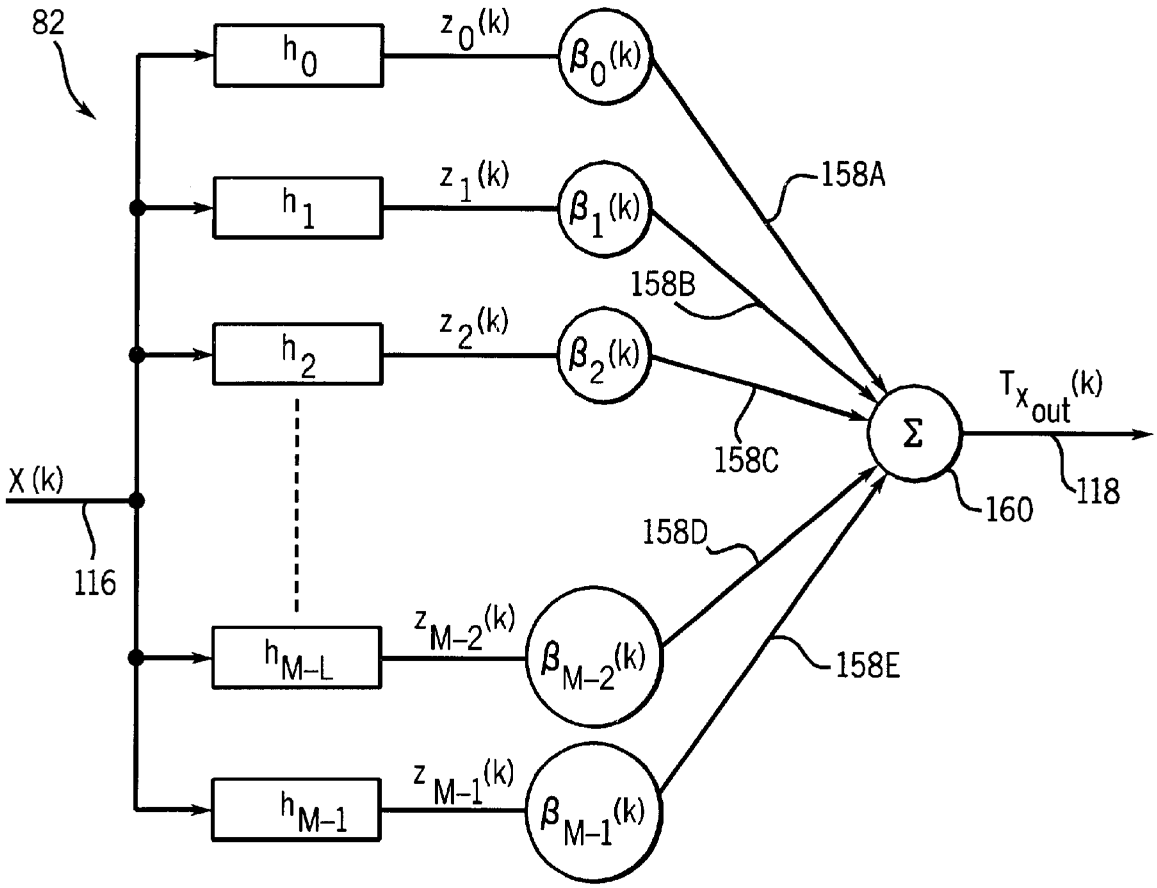
FIG. 8A is a schematic drawing illustrating the preferred manner of noise reduction filtering for the cellular telephone input signal.

FIG. 8A illustrates the preferred noise reduction filter 82 which receives the raw telephone input signal designated as x(k) in line 116 from the microphone steering switch 80 and system 78 shown in FIG. 3A. The same noise reduction filter 82 is preferably used in the system 78*a* shown in FIG. 3B at the locations of noise reduction filters 82*a*, 82*b* to operate on the near-end and far-end voice signals, respectively. For the sake of clarity, the following discussion relating to noise reduction filter 82 assumes that the noise reduction filter 82 is in the location shown in FIG. 3A. The raw telephone input signal x(k) in line 116 inputs a plurality of M fixed filters $h_0$, $h_1$, $h_2$ . . . $h_{M-2}$, $h_{M-1}$. The plurality of fixed filters $h_0$, $h_1$, $h_2$ . . . $h_{M-2}$, $h_{M-1}$ preferably span the audible frequency spectrum. Each of the fixed filters outputs a respective filtered telephone input signal $z_0(k)$, $z_1(k)$, $z_2(k)$ . . . $z_{M-2}(k)$, $z_{M-1}(k)$. The fixed filters are preferably a reclusive implementation of a discrete cosine transform in the time domain modified to stabilize performance on digital signal processors, however, other types of fixed filters can be used in accordance with the invention. For instance, Karhunen-Loeve transforms, wavelet transforms, or even the eigen filters for an eigen filter adaptation band filter (EAB) or an eigen filter filter bank (EFB) as disclosed in U.S. Pat. No. 5,561,598, entitled "Adaptive Control system With Selectively Constrained Output And Adaptation" by Michael P. Nowak et al., issued on Oct. 1, 1996, herein incorporated by reference, are examples of other fixed filters that may be suitable for the noise reduction filter 82.

Figure 8D:
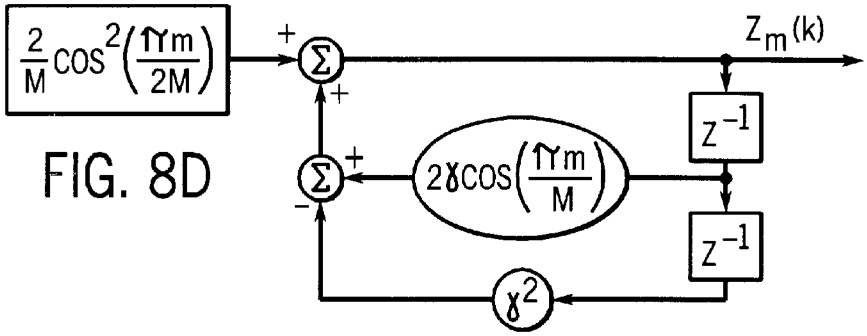
FIGS. 8B, 8C and 8D are schematic block diagrams showing the preferred transforms implemented in the noise reduction filter shown in FIG. 8A.
Figure 8B:
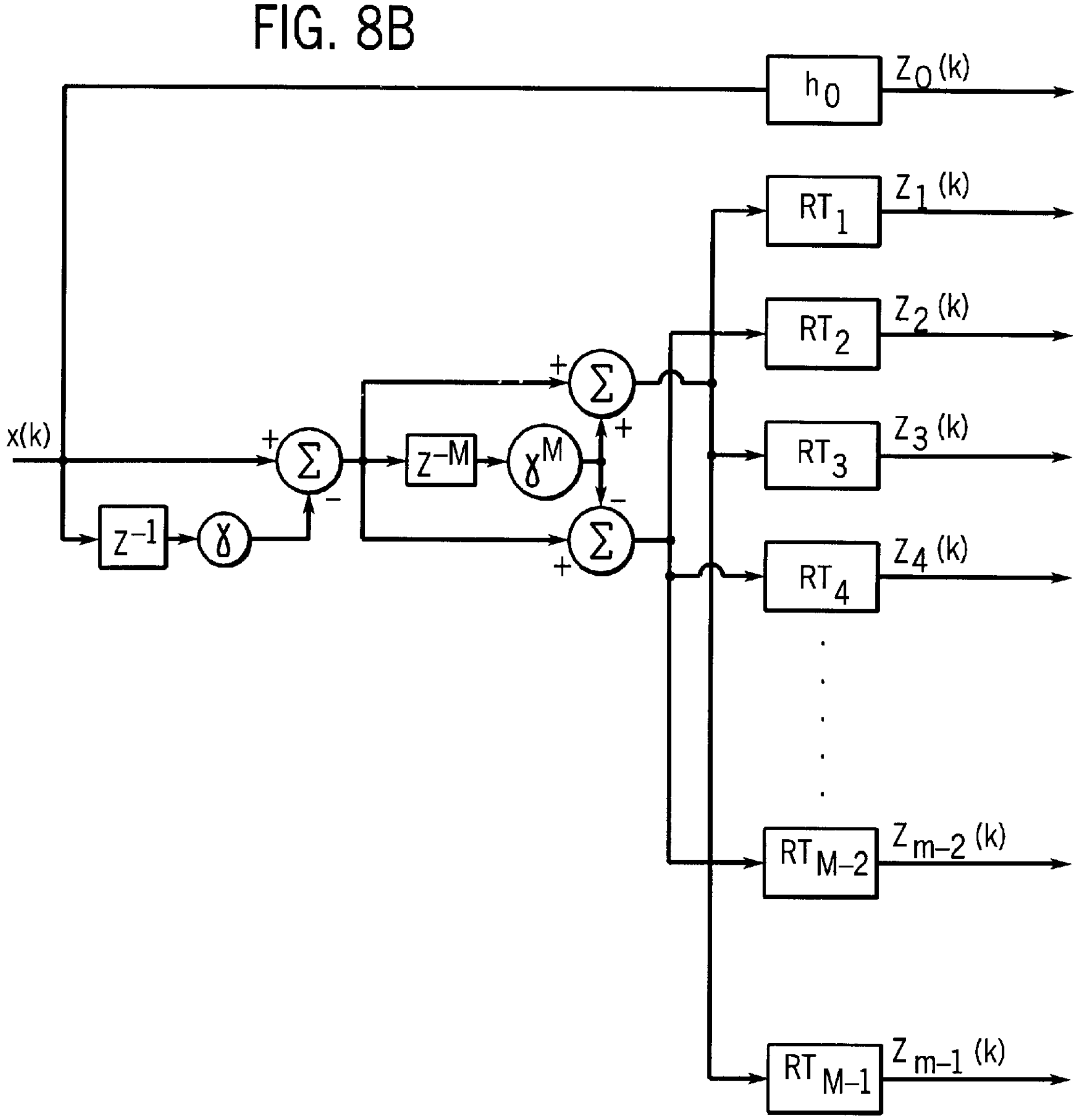
Figure 8C:
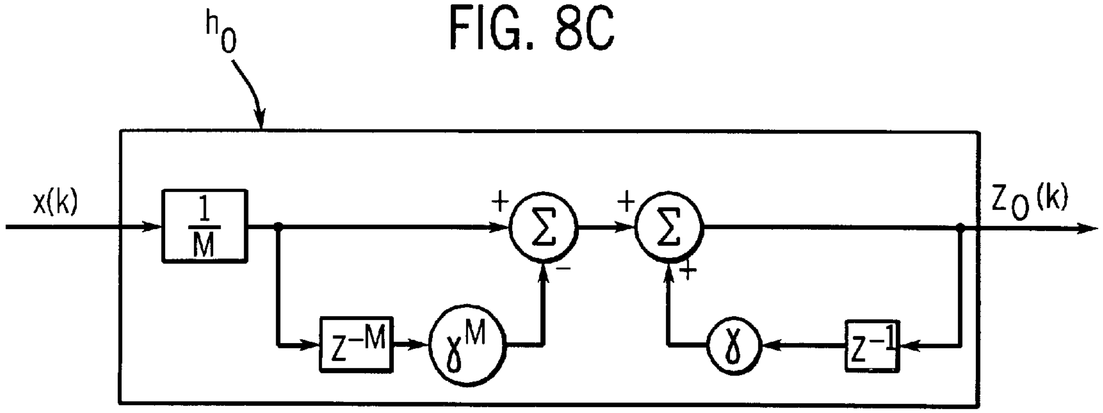

In the preferred embodiment of the invention, the plurality of fixed filters $h_0$, $h_1$, $h_2$ . . . $h_{M-2}$, $h_{M-1}$ are infinite impulse response filters in which the filtered telephone input signals $z_0(k), z_1(k), z_2(k) \ldots z_{M-2}(k), z_{M-1}(k)$ are represented by the following expressions:

$$z_0(k) = \left[\frac{1}{M}\right][x(k) - \gamma^M x(k-M)] + \gamma z_0(k-1) \quad \text{(Eq. 1)}$$

for fixed filter $h_0$; and $$z_m(k) = \left[\frac{2}{M}\cos^2\left(\frac{\pi m}{2M}\right)\right]\left[(x(k) - \gamma x(k-1) + (-1)^m\gamma^{M+1}x(k-[M+1]) - (-1)^m\gamma^M x(k-M)\right] + 2\gamma\cos\left(\frac{\pi m}{M}\right)z_m(k-1) - \gamma^2 z_m(k-2) \quad \text{(Eq. 2)}$$

for fixed filters $h_1, h_2 \ldots h_{M-2}, h_{M-1}$; where $\gamma$ is a stability parameter, x(k) is the raw telephone input signal for sampling period k, M is the number of fixed filters $h_0, h_1, h_2 \ldots h_{M-2}, h_{M-1}$, and $z_m$ is the filtered telephone input signal for the $m^{th}$ filter $h_0, h_1, h_2 \ldots h_{M-2}, h_{M-1}$. The stability parameter $\gamma$ used in Equations 1 and 2 should be set to approximately 1, for example 0.975. The implementation of Equations 1 and 2 in block form is shown schematically in FIGS. 8B, 8C and 8D. In FIG. 8B (Equation 2), the blocks labelled $RT_1$, $RT_2$, $RT_3$, $RT_4 \ldots RT_{M-2}$, and $RT_{M-1}$ designate the recursive portions of the fixed filters $h_1, h_2, h_3, h_4 \ldots h_{M-2}$, and $h_{M-1}$, respectively. FIG. 8D illustrates the implementation of $RT_m$ for the $m^{th}$ filter $h_1, h_2, h_3, h_4 \ldots h_{M-2}$, and $h_{M-1}$. The implementation of fixed filter $h_0$ in accordance with Equation 1 is shown in FIG. 8C.

Alternatively, the fixed filters $h_0, h_1, h_2 \ldots h_{M-2}, h_{M-1}$ may be realized by finite impulse response filters. The preferred transform as represented by a set of finite impulse response filter is given by the following expressions:

$$z_m(k) = \sum_{n=o}^{M-1} h_m(n)x(k-n) \quad \text{(Eq. 3)}$$

$$z_m(k) = \sum_{n=o}^{M-1}\left[\frac{G_m}{M}\gamma^n\cos\left(\frac{\pi(2n+1)m}{2M}\right)\right]x(k-n)$$

where M is the number of fixed filters $h_0, h_1, h_2 \ldots h_{M-2}, h_{M-1}$, $h_m(n)$ is the $n^{th}$ coefficient of the $m^{th}$ filter, x(k-n) is a time-shifted version of the raw telephone input signal x(k), n=0, 1, . . . M-1, $z_m(k)$ is the filtered telephone input signal for the $m^{th}$ filter $h_0, h_1, h_2 \ldots h_{M-2}, h_{M-1}$, $\gamma$ is a stability parameter, $G_m=1$ for m=0 and $G_m=2$ for $m \neq 0$.

The preferred transforms expressed in Equations 1 through 3 can be implemented efficiently, especially in the IIR form of Equations 1 and 2. From a theoretical standpoint, the Karhunen-Loeve transform is probably optimal in the sense that it orthogonalizes or decouples noisy speech signals into speech and noise components most effectively. However, the transform of Equations 1 and 2 can also be used to compute orthogonal filtered telephone input signals $z_0(k), z_1(k), z_2(k) \ldots z_{M-2}(k), z_{M-1}(k)$ for each sample period. Further, the transform filter coefficients and the filter output are real values, therefore no complex arithmetic is introduced into the system.

The fixed filters $h_0, h_1, h_2 \ldots h_{M-2}, h_{M-1}$ act as a group of band pass filters to break the raw telephone input signal x(k) into M different frequency bands of the same bandwidth. For example, filter $h_m$ has a band pass from about $(F_s/(M))$ (m-0.5) Hz to $(F_s/(2M))$ (m+0.5) Hz resulting in a bandwidth of $F_s/(2M)$ Hz, where $F_s$ is the sampling frequency. Thus, providing more fixed filters $h_0, h_1, h_2 \ldots h_{M-2}, h_{M-1}$ (i.e. the greater the value is for the number M) improves the frequency resolution of the system 82. In general, the number of fixed filters $h_0, h_1, h_2 \ldots h_{M-2}, h_{M-1}$ is chosen to be as large as possible and is limited to the amount of processing power available on the electronic controller 30 for a particular sampling rate. For instance, if the electronic controller 30 has a digital signal processor which is a Texas Instrument TMS320C30DSP running at 8 kHz, the system should preferably have approximately 20–25 fixed filters $h_0, h_1, h_2 \ldots h_{M-2}, h_{M-1}$.

Each of the filtered telephone input signals $z_0(k), z_1(k), z_2(k) \ldots z_{M-2}(k), z_{M-1}(k)$ is weighted by a respective time-varying filter gain element $\beta_0(k), \beta_1(k), \beta_2(k) \ldots \beta_{M-2}(k), \beta_{M-1}(k)$. Each of the time-varying filter gain elements $\beta_0(k), \beta_1(k), \beta_2(k) \ldots \beta_{M-2}(k), \beta_{M-1}(k)$ is preferably determined in accordance with the following expression:

$$\beta_m(k) = \left[1 - \frac{1}{SSL_m(k) + \alpha}\right]^\mu \quad \text{(Eq. 4)}$$

where $\beta_m(k)$ is the value of the time-varying filter gain element associated with the $m^{th}$ fixed filter $h_0, h_1, h_2 \ldots h_{M-2}, h_{M-1}$ at sampling period k, $SSL_m(k)$ is the speech strength level for the respective filtered telephone input signal $z_0(k), z_1(k), z_2(k) \ldots z_{M-2}(k), z_{M-1}(k)$ at sampling period k, and $\mu$ and $\alpha$ are preselected performance parameters having values greater than 0. It has been found that selecting $\mu$ equal to approximately 4, and $\alpha$ equal to approximately 2 provides adequate noise reduction while retaining natural sounding processed speech. If the noise power for a frequency band is excessive, it can be useful in some applications to set the corresponding time-varying gain element $\beta_m(k)=0$. The time-varying filter gain elements $\beta_0(k), \beta_1(k), \beta_2(k) \ldots \beta_{M-2}(k), \beta_{M-1}(k)$ each output a respective weighted and filtered telephone input signal in lines 158A, 158B, 158C, 158D, and 158E, respectively. The weighted and filtered telephone input signals are combined in summer 160 which outputs the noise-reduced telephone input signal $Tx_{out}(k)$ in line 118. The noise-reducing filtering technique shown in FIG. 8 is particularly useful because it is implemented on a sample-by-sample basis, and does not require an explicit inverse transform. Noise reduction filtering is accomplished on-line in real time.

The speech strength level $SSL_m(k)$ for the respective filtered telephone input signal $z_0(k), z_1(k), z_2(k) \ldots z_{M-2}(k), z_{M-1}(k)$ at sample period k is determine in accordance with the following expression:

$$SSL_m(k) = \frac{s\_pwr_m(k)}{n\_pwr_m(k)} \quad \text{(Eq. 5)}$$

where $s\_pwr_m(k)$ is an estimate of combined speech and noise power in the $m^{th}$ filtered telephone input signal $z_0(k), z_1(k), z_2(k) \ldots z_{M-2}(k), z_{M-1}(k)$ at sample period k and $n\_pwr_m(k)$ is an estimate of noise power in the $m^{th}$ filtered telephone input signal of sample period k. It is preferred that the combined speech and noise power level $s\_pwr_m(k)$ for the respective filtered telephone input signal $z_0(k), z_1(k), z_2(k) \ldots z_{M-2}(k), z_{M-1}(k)$ at sample period k be estimated in accordance with the following expression:

$$s\_pwr_m(k) = s\_pwr_m(k-1) + \lambda_m(z_m(k)*z_m(k) - s\_pwr_m(k-1)) \quad \text{(Eq. 6)}$$

where $\lambda_m$ is a fixed time constant that is in general different for each of the M fixed filters $h_0, h_1, h_2 \ldots h_{M-2}, h_{M-1}$, and $z_m(k)$ is the value of the respective filtered telephone inputs $z_0(k)$, $z_1(k)$, $z_2(k)$ . . . $z_{M-2}(k)$, $z_{M-1}(k)$ at sample period k taken when speech is present in the raw telephone input signal x(k), or in other words, when the input line is in the "on" state. The time constants $\lambda_m$ are determined so that the effective length of the averaging window used to estimate the power in a particular frequency band is proportional to the center frequency of the frequency band. In other words, the time constant $\lambda_m$ increases to yield a faster estimation of speech and noise power level as the center frequency of the band increases. This ensures a fast overall dynamic system response. The time constants $\lambda_m$ are preferably less than 0.10 and greater than 0.01.

The noise power level estimate $n\_pwr_m(k)$ for the filtered telephone input signals $z_0(k)$, $z_1(k)$, $z_2(k)$ . . . $z_{M-2}(k)$, $z_{M-1}(k)$ used for sample period k is preferably estimated in accordance with the following expression:

$$n\_pwr_m(k)=n\_pwr_m(k-1)+\lambda_0(z_m(k)*z_m(k)-n\_pwr_m(k-1)) \quad \text{(Eq. 7)}$$

where $z_m(k)$ is the value of the respective filtered telephone input signal $z_0(k)$, $z_1(k)$, $z_2(k)$ . . . $z_{M-2}(k)$, $z_{M-1}(k)$ at sample period k taken when speech is not present in the raw telephone input signal x(k), and $\lambda_0$ is a fixed time constant preferably set to a small value, such as $\lambda_0$ equal to approximately $10^{-3}$. Setting fixed time constant $\lambda_0$ to a small value provides a long averaging window for estimating the noise power level $n\_pwr_m(k)$.

The noise reduction filter 82 generally has two modes of operation, a noise estimation mode and a speech filtering mode. In the noise estimation mode, background noise for each band corresponding to the fixed filters $h_0$, $h_1$, $h_2$ . . . $h_{M-2}$, $h_{M-1}$ is estimated. In order to track changes in noise conditions within the vehicles 15, the noise reduction filter 82 periodically returns to the noise estimation mode when speech is not present in the raw telephone input signal x(k) (i.e. when the microphone steering switch 80 is switched to the idle state 120, FIG. 4). In practice, it is desirable to estimate only the stationary background noise present on the microphone signals (i.e., background noise which statistically does not vary substantially over time). This is accomplished by setting a time constant $\lambda_0$ equal to a small value, such as $\lambda_0$ equal to approximately $10^{-3}$.

When speech is present in the raw telephone input signal x(k), the system operates in the speech filtering mode. After estimating the combined speech and noise power level $s\_pwr_m(k)$ at the sample period k for each of the filtered telephone input signals $z_0(k)$, $z_1(k)$, $z_2(k)$ . . . $z_{M-2}(k)$, $z_{M-1}(k)$, the respective time-varying filter gain elements $\beta_0(k)$, $\beta_1(k)$, $\beta_2(k)$ . . . $\beta_{M-2}(k)$, $\beta_{M-1}(k)$ are adjusted between 0 and 1 according to the signal-to-noise power ratio $SSL_m(k)$ corresponding to each filtered telephone input signal $z_0(k)$, $z_1(k)$, $z_2(k)$ . . . $z_{M-2}(k)$, $z_{M-1}(k)$, Eq. 4. For example, if the speech strength level is large in a particular band, the corresponding gain element will be approximately one, thus passing the speech on this band. If the SSL is small, the corresponding gain element will be approximately zero, thus removing the noise in this band. As mentioned above, it may be useful to set $\beta_m(k)=0$ when $n\_pwr_m(k)$ is greater than a preselected threshold value. In this manner, the time-varying filter gain elements $\beta_0(k)$, $\beta_1(k)$, $\beta_2(k)$ . . . $\beta_{M-2}(k)$, $\beta_{M-1}(k)$ track the characteristics of speech present within the raw telephone input signal x(k) and thereby create a more intelligible noise-reduced telephone input signal $Tx_{out}(k)$.

Figure 9A:
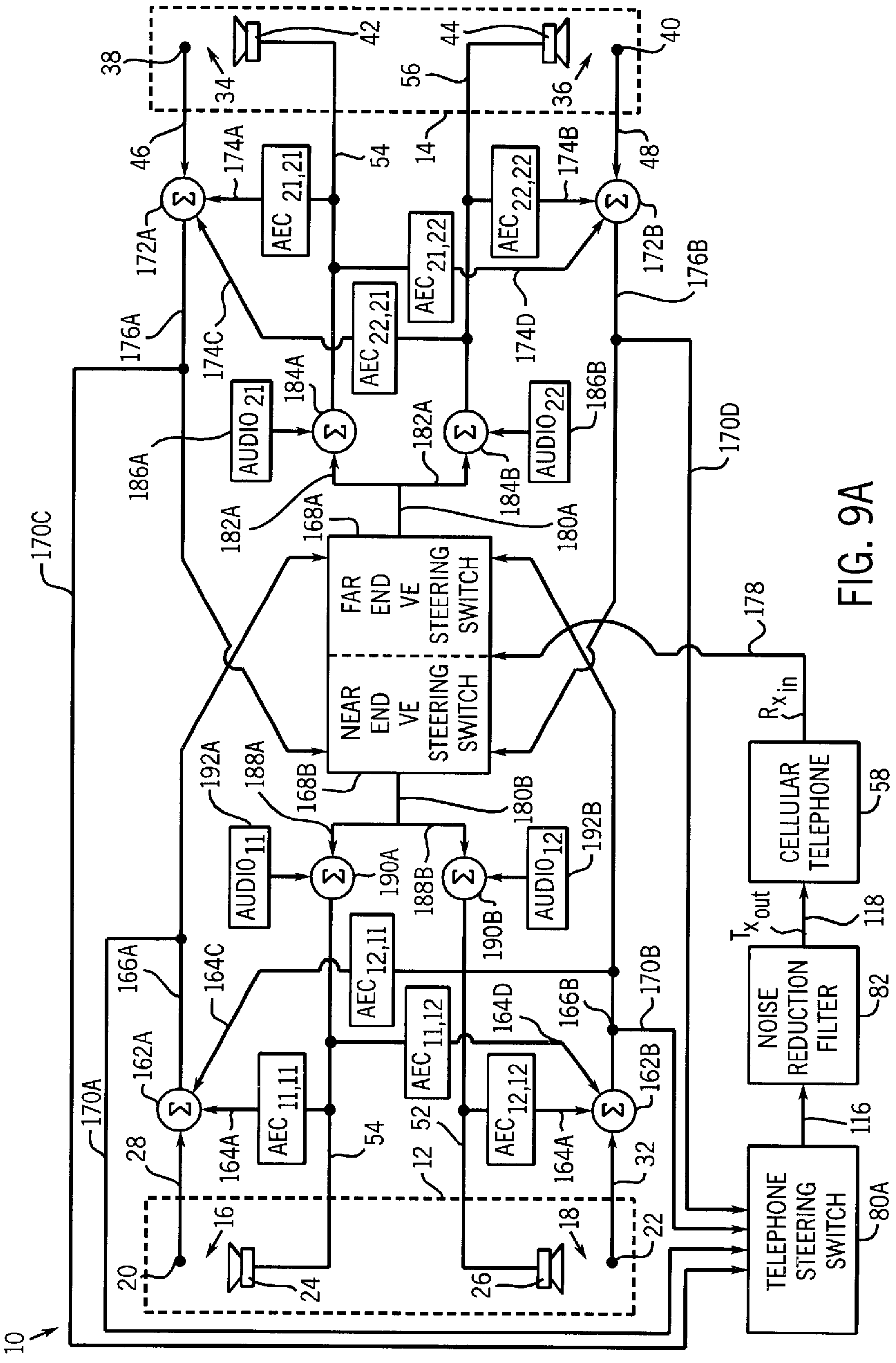
FIG. 9A is a block diagram illustrating an integrated multiple channel vehicle voice enhancement system and hands-free cellular telephone system in accordance with the invention, which uses a single noise reduction filter.

FIG. 9A schematically illustrates the MIMO integrated vehicle voice enhancement system and hands-free cellular telephone system 10 illustrated in FIG. 1. In many respects, the MIMO system 10 shown in FIG. 9 is similar to the SISO system 78 shown in FIG. 3, and like reference numerals will be used where helpful to facilitate understanding of the invention.

In FIG. 9A, the first near-end microphone 20 senses speech and noise present at speaking location 16 and generates a first near-end voice signal that is transmitted through line 28 to a first near-end echo cancellation summer 162A. The first near-end echo cancellation summer 162A also inputs a first near-end echo cancellation signal from line 164A and a third near-end echo cancellation signal from line 164C. The first near-end echo cancellation signal in line 164A is generated by a first near-end adaptive acoustic echo canceller $AEC_{11,11}$. The first near-end adaptive echo canceller $AEC_{11,11}$ (as well as the other adaptive echo cancellers in FIG. 9 $AEC_{11,12}$, $AEC_{12,11}$, $AEC_{12,12}$, $AEC_{21,21}$, $AEC_{21,22}$, $AEC_{22,21}$, and $AEC_{22,22}$) is preferably an adaptive FIR filter as discussed with respect to FIG. 3, and inputs a first near-end input signal in line 54 that drives the first near-end loudspeaker 24. The third adaptive echo canceller $AEC_{12,11}$ inputs a second near-end input signal in line 52 that drives the second near-end loudspeaker 26, and outputs the third near-end echo cancellation signal in line 164C. The first near-end echo cancellation summer 162A subtracts the first near-end echo cancellation signal in line 164A and the third near-end echo cancellation signal in line 164C from the first near-end voice signal in line 28 to generate a first echo-cancelled, near-end voice signal in line 166A. The first adaptive acoustic echo canceller $AEC_{11,11}$ adaptively models the path between the first near-end loudspeaker 24 and the output of the first near-end microphone 20. The third adaptive echo canceller $AEC_{12,11}$ adaptively models the path between the second near-end loudspeaker 26 and the output from the first near-end microphone 20. Thus, the first near-end echo cancellation summer 162A subtracts from the first near-end voice signal in line 28 that portion of the signal due to sound introduced by the first near-end loudspeaker 24, and also that portion of the signal due to sound introduced by the second near-end loudspeaker 26. The first echo-cancelled, near-end voice signal in line 166 is transmitted to both a far-end voice enhancement steering switch 168A and also to a telephone steering switch 80A through line 170A.

The second near-end microphone 22 senses speech and noise present at speaking location 18 and outputs a second near-end voice signal through line 32 to a second near-end echo cancellation summer 162B. The second near-end echo cancellation summer 162B also receives a second near-end echo cancellation signal in line 164B and a fourth near-end echo cancellation signal in line 164D. The second near-end echo cancellation in line 164B is generated by a second near-end adaptive acoustic echo canceller $AEC_{12,12}$. The second near-end adaptive acoustic echo canceller $AEC_{12,12}$ inputs the second near-end input signal in line 52 which drives the second near-end loudspeaker 26. The fourth near-end echo cancellation signal in line 164D is generated by a fourth near-end adaptive acoustic echo canceller $AEC_{11,12}$. The fourth near-end adaptive acoustic echo canceller $AEC_{11,12}$ inputs the first near-end input signal in line 54 that drives the first near-end loudspeaker 24. The second near-end echo cancellation summer 162B subtracts the second near-end echo cancellation signal in line 164B and the fourth near-end echo cancellation signal in line 164D from the second near-end voice signal in line 32 to generate a second echo-cancelled, near-end voice signal in line 166B. The second near-end adaptive acoustic echo canceller $AEC_{12,12}$ adaptively models the path between the second near-end loudspeaker 26 and the output of the second near-end microphone 22. The fourth near-end adaptive acoustic echo canceller $AEC_{11,12}$ adaptively models the path between the first near-end loudspeaker 24 and the output of the second near-end microphone 22. Thus, the second near-end echo cancellation summer 162B subtracts from the second near-end voice signal in line 32 that portion of the signal due to sound introduced by the second near-end loudspeaker 26, and also that portion of the signal due to sound introduced by the first near-end loudspeaker 24. The second echo-cancelled, near-end voice signal in line 166B is transmitted to both the far-end voice enhancement steering switch 168A, and to the telephone steering switch 80A through line 170B.

The first far-end microphone 38 senses speech and noise present at speaking location 34 within the far-end zone 14 and generates a first far-end voice signal that is transmitted through line 46 to a first far-end cancellation summer 172A. The first far-end echo cancellation summer 172A also inputs a first far-end echo cancellation signal from line 174A and a third far-end echo cancellation signal from line 174C. The first far-end echo cancellation signal in line 174A is generated by a first far-end adaptive acoustic echo canceller $AEC_{21,21}$. The first far-end adaptive acoustic echo canceller $AEC_{21,21}$ inputs a first far-end input signal in line 54 that drives the first far-end loudspeaker 42. The third far-end echo cancellation signal in line 174C is generated by the third far-end adaptive acoustic echo canceller $AEC_{22,21}$. The third far-end adaptive echo canceller $AEC_{22,21}$ inputs a second far-end input signal in line 56 that also drives the second far-end loudspeaker 44. The first far-end adaptive acoustic canceller $AEC_{21,21}$ models the path between the first far-end loudspeaker 42 and the output of the first far-end microphone 38. The third far-end adaptive acoustic echo canceller $AEC_{22,21}$ models the path between the second far-end loudspeaker 44 and the output of the first far-end microphone 38. The first far-end echo cancellation summer 172 subtracts the first far-end echo cancellation signal in line 174A and the third far-end echo cancellation signal in line 174C from the first far-end voice signal in line 46 to generate a first echo cancelled, far-end voice signal in line 176A. The first echo-cancelled, far-end voice signal in line 176A is transmitted both to a near-end voice enhancement steering switch 168B, and also to the telephone steering switch 80A through line 170C.

The second far-end microphone 40 senses speech and noise present at speaking location 36 in the far-end zone 14 and generates a second far-end voice signal that is transmitted to a second far-end cancellation summer 172B through line 48. A second far-end echo cancellation signal in line 174B and a fourth far-end echo cancellation signal in line 174D also input the second far-end echo cancellation summer 172B. The second far-end echo cancellation signal in line 174B is generated by a second far-end adaptive acoustic echo canceller $AEC_{22,22}$. The second far-end adaptive acoustic echo canceller $AEC_{22,22}$ inputs the second far-end input signal in line 56 which also drives the second far-end loudspeaker 44. The second far-end adaptive acoustic echo canceller $AEC_{22,22}$ models the path between the second far-end loudspeaker 44 and the output of the second microphone 40. The fourth far-end echo cancellation signal in 174D is generated by a fourth far-end adaptive acoustic echo canceller $AEC_{21,22}$. The fourth far-end adaptive acoustic echo canceller $AEC_{21,22}$ inputs the first far-end input signal in line 54 that drives the first far-end loudspeaker 42. The fourth far-end adaptive acoustic echo canceller $AEC_{21,22}$ models the path between the first far-end loudspeaker 42 and the output of the second far-end microphone 40. The second far-end echo cancellation summer 172B subtracts the second echo cancellation signal in line 174B and the fourth echo cancellation signal in line 174D from the second far-end voice signal in line 48 to generate a second echo-cancelled, far-end voice signal in line 176B. The second echo-cancelled, far-end voice signal in line 176B is transmitted to both the near-end voice enhancement steering switch 168B, and also to the telephone steering switch 80A through line 170D.

Figure 10:
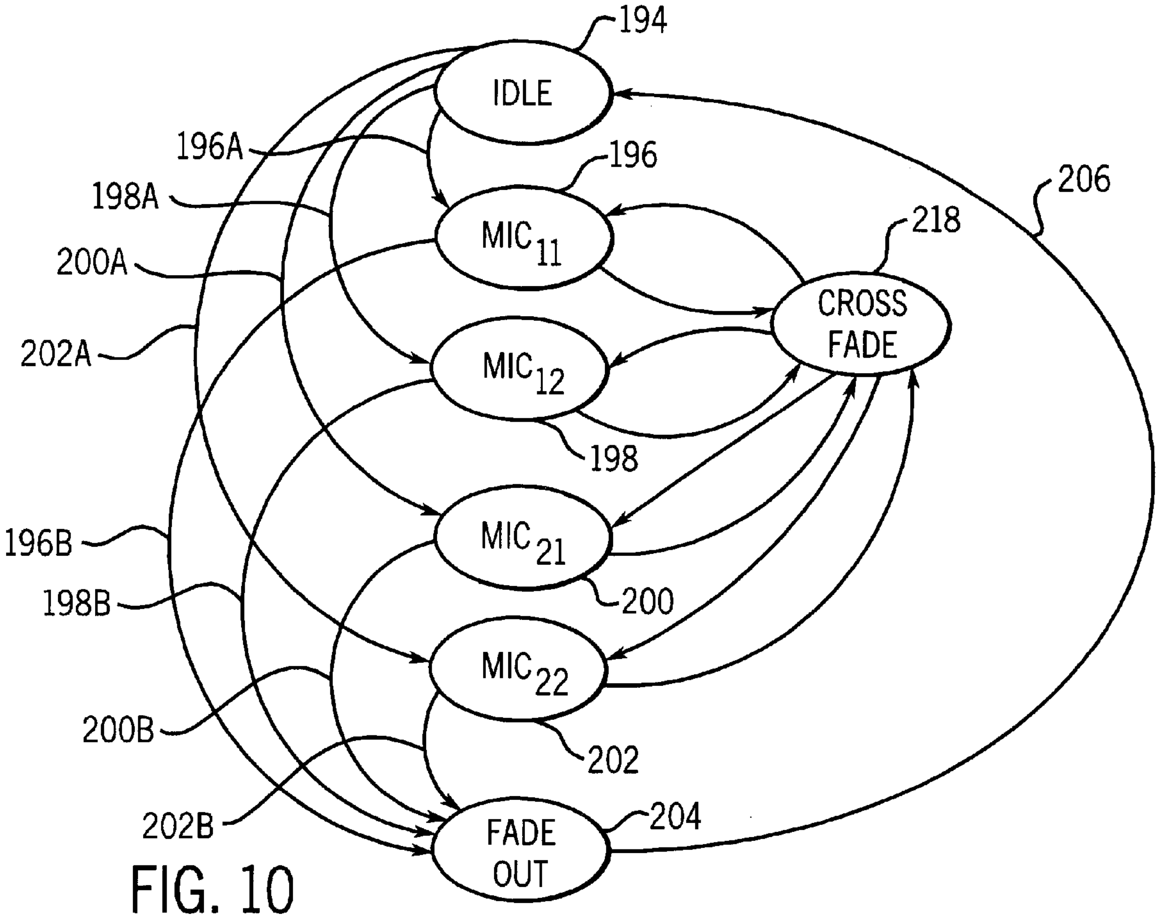
FIG. 10 is a state diagram illustrating a preferred microphone steering technique for a telephone steering switch shown in FIG. 9.

The telephone steering switch 80A outputs a raw telephone input signal in line 116 preferably in accordance with the state diagram shown in FIG. 10. The raw telephone input signal in line 116 inputs the noise reduction filter 82, which is preferably the same as the filter shown in FIG. 8. The noise reduction filter 82 outputs a noise-reduced telephone input signal $Tx_{out}(k)$ to the cellular telephone 58. The cellular telephone 58 outputs a telephone receive signal $Rx_{in}$ in line 178 that is eventually transmitted to the loudspeakers 24, 26, 42, and 44 in the system 10.

FIG. 9A shows the telephone receive signal $Rx_{in}$ inputting block 168A, 168B which schematically illustrates both the near-end voice enhancement steering switch 168A and the far-end voice enhancement steering switch 168B. The far-end voice enhancement steering switch 168A operates generally in the same manner as the steering switch 80 shown in FIG. 3 and described in conjunction with FIGS. 4 and 7, however, microphone output in the "off" state for the far-end voice enhancement steering switch 168A preferably sets microphone output to 10% or less, rather than approximately 20%. The far-end voice enhancement steering switch 168A thus selects and mixes the first and second echo-cancelled, near-end voice signals in line 166A and 166B and generates a far-end voice enhancement input signal in line 180A. One purpose of the near-end voice enhancement steering switch 168B and of the far-end voice enhancement steering switch 168A is to reduce and/or eliminate microphone falsing within the respective acoustic zones 12, 14. For instance, both of the near-end microphones 20 and 22 are likely to sense speech from a single passenger and/or drive located in the near-end acoustic zone 12, especially if the driver and/or passenger is not located in close proximity to one of the microphones 20, 22 or the driver and/or passenger is speaking loudly (i.e., both of the near-end microphones 20, 22 are acoustically coupled to one another).

FIG. 9A shows the far-end voice enhancement input signal in line 180A being transmitted through line 182A to a first far-end audio summer 184A and also through line 182B to a second audio summer 184B. Block 186A illustrates the generation of a first far-end audio signal that is summed in summer 184A with the far-end voice enhancement input signal 182A to generate the first far-end input signal in line 54 that drives the first far-end loudspeaker 42. Block 186B illustrates the generation of a second far-end audio signal that is summed in summer 184B with the far-end voice enhancement input signal in line 182B to generate the second far-end input signal in line 56 that drives the second far-end loudspeaker 44.

The near-end voice enhancement steering switch 168B operates generally in the same manner as the far-end voice enhancement steering switch 168A. The near-end voice enhancement steering switch 168B selects and mixes the first and second echo-cancelled, far-end voice signals in lines 176A and 176B and generates a near-end voice enhancement input signal in line 180B. The near-end voice enhancement input signal in 180B is transmitted through line 188A to a first near-end audio summer 190A and through line 188B to a second audio summer 190B. Block 192A illustrates the generation of a first near-end audio signal that is summed in summer 190A with the near-end voice enhancement input signal in line 188A to generate the first near-end input signal in line 54 that drives the first near-end loudspeaker 24. Block 192B illustrates the generation of a second near-end audio signal that is combined in summer 190B with the near-end voice enhancement input signal in line 188B to generate the second near-end input signal in line 52 that drives the second near-end loudspeaker 26.

When the telephone receive signal $Rx_{in}$ is present in line 178, it is preferred that block 168A, 168B transmit the telephone receive signal $Rx_{in}$ in both lines 180A and 180B, rather than a form of echo-cancelled voice signals from the respective microphones 20, 22, 38 and 40. In addition, it is desirable that audio input illustrated by blocks 186A, 186B, 192A, 192B be suspended while the cellular telephone 58 is in operation.

Figure 9B:
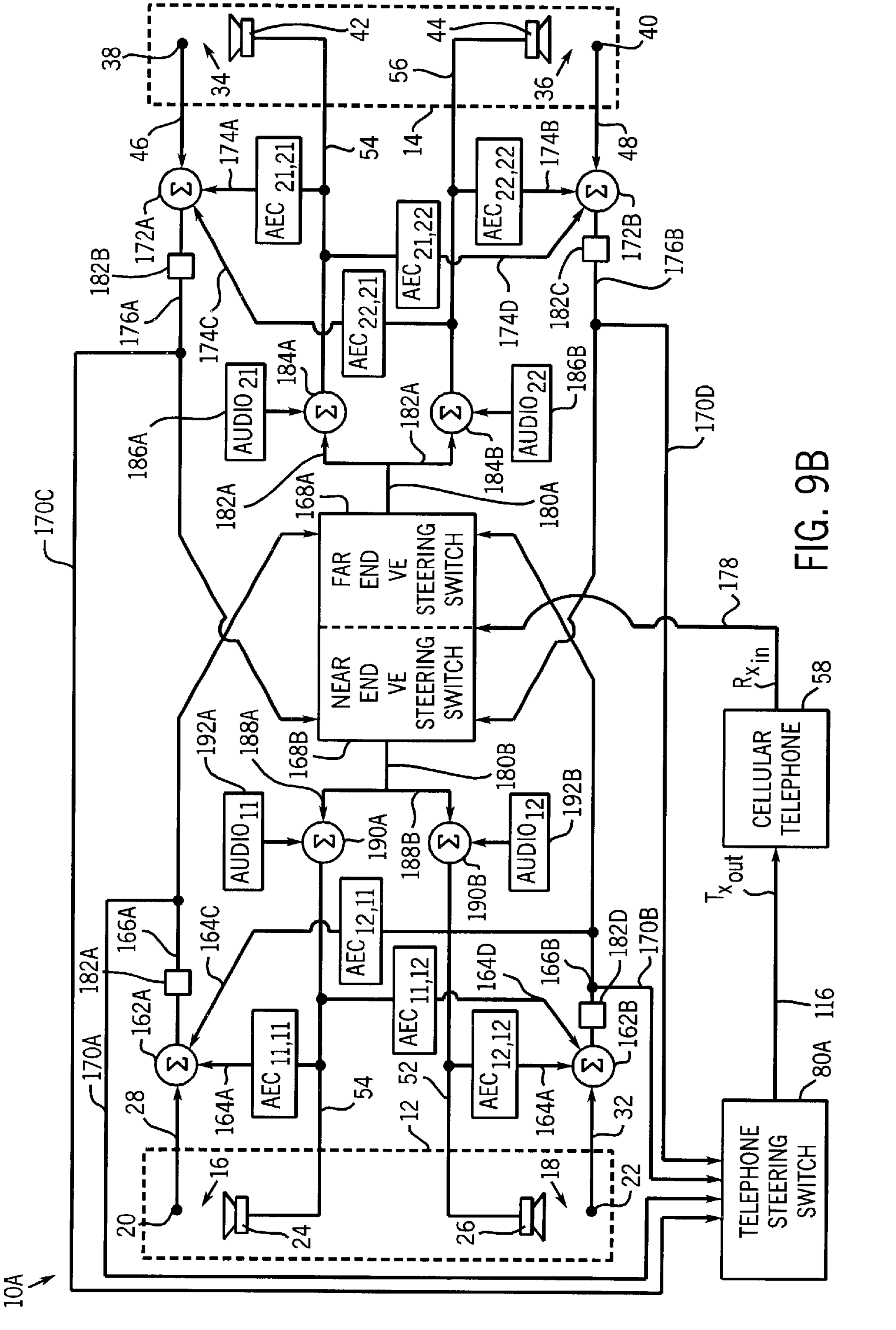
FIG. 9B is a block diagram illustrating an integrated multiple channel vehicle voice enhancement system and hands-free cellular telephone system in accordance with the invention, which uses a plurality of noise reduction filters.

The MIMO system 10A shown in FIG. 9B is similar in many respects to the MIMO system 10 shown in FIG. 9A, except the noise reduction filter 82 shown in FIG. 9A has been replaced by a plurality of noise reduction filters 182A, 182B, 182C, and 182D. In FIG. 9B, the noise reduction filters 182A, 182B, 182C, 182D are placed in the echo-cancelled near-end voice signal lines 166A, 166B and the echo-cancelled far-end voice signal lines 176A and 176B, respectively. In addition to improving the clarity of the telephone input signal, $Tx_{out}$, this implementation also removes the background noise in the voice signals themselves. Noise reduction filter 182A removes the background noise in the first echo-cancelled near-end voice signal lin 166A, noise reduction filter 182D removes the background noise int he second echo-cancelled near-end voice signal line 166B, noise reduction filter 182B removes the background noise in the first echo-canceled far-end voice line 176A, and noise reduction filter 182C removes the background noise in the second echo-cancelled far-end voice line 176B, therefore preventing the rebroadcasting of noise on the pair of near-end loudspeakers 24, 26 and the pair of far-end loudspeaker 42, 44, respectively. In other respects, the MIMO system 10A shown in FIG. 9B is similar to the MIMO system 10 shown in FIG. 9A.

FIG. 10 is a state diagram illustrating the operation of the telephone steering switch 80A in FIGS. 9A and 9B. The idle state 194 indicates that none of the microphones 20, 22, 38, 40 are generating a voice signal having a sound level exceeding the threshold switching value 66, FIG. 2A. In FIG. 19, state 196 indicates that the first near-end microphone 20 labelled as $MIC_{11}$ is the designated primary microphone. State 198 indicates that the second near-end microphone 22 labelled as $MIC_{12}$ is the designated primary microphone. State 200 indicates that the first far-end microphone 38 labeled as $MIC_{21}$ is the designated primary microphone. State 202 indicates that the second far-end microphone 40 labelled as $MIC_{22}$ is the designated primary microphone. Lines 196A, 198A, 200A, and 202A illustrate that when the system is in the idle state 914, the system designates the first microphone to have a voice signal with a sound level exceeding the threshold switching value 66, FIG. 2A, as the designated primary microphone. Lines 196B, 198B, 200B and 202B indicate that the designated primary microphone will enter the fade-out state 204 after expiration of a holding time period $t_H$, and fade-out from the "on" state to the "off" state, as long as no other microphone is requesting priority to be the designated primary microphone. Line 206 from the fade-out state 204 to the idle state 194 indicates that the system enters the idle state 194 once the fade-out state 204 is completed. The cross-fade state 208 illustrates that the designated primary microphone cross-fades from the "on" state to the "off" state when one of the other microphones gains priority to become the designated primary microphone. It is desirable that the three microphones which are not designated as the primary microphone compete among each other to determine which of the three other microphones may request priority to become the designated primary microphone. Such a competition can occur in various ways, but preferably the microphone signal having the highest sound level determined via round-robin is designated as the priority requesting microphone. Otherwise, cross-fading is preferably implemented in accordance with the cross-fading described in FIGS. 6A and 6B.

As with the SISO systems in FIGS. 3A and 3B, it is desirable that the raw telephone input signal in line 116 be a combination of 100% of the designated primary microphone signal and approximately 20% of the microphone signals of microphones in the "off" state. In some vehicles, it may be desirable to lower the percentage of microphone signal transmitted from microphones in the "off" state. In any event, the MIMO system shown in FIGS. 9A, 9B and 10 has more microphones than the SISO systems shown in FIGS. 3A and 3B, and therefore noise reduction filtering, block 82 in FIG. 9A and blocks 182A, 182B, 182C, 182D in FIG. 9B, is extremely desirable so that an intelligible, noise-reduced telephone input signal $Tx_{out}$ is transmitted to the cellular telephone 58. In addition, the system 10 shown in FIG. 9A and the system 10A shown in FIG. 9B can also include privacy switches (not shown) similar to privacy switches 110 and 112 shown in the system 78 in FIGS. 3A and 3B.

Figure 11:
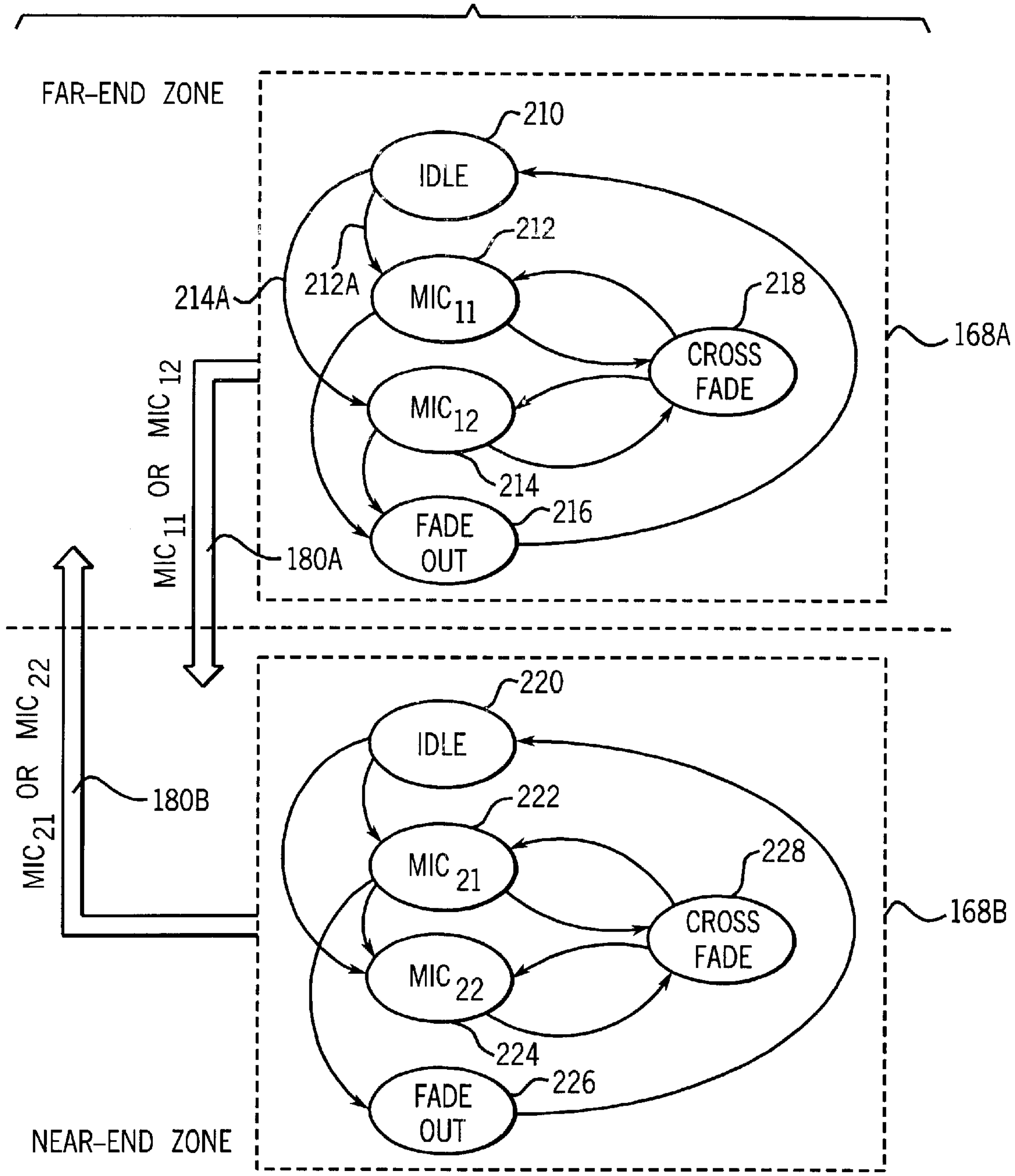
FIG. 11 is a state diagram illustrating a preferred microphone steering technique for voice enhancement steering switches shown in FIG. 9.

FIG. 11 is a state diagram showing the operation of the far-end voice enhancement steering switch 168A and the near-end voice enhancement steering switch 168B. In FIG. 11 as in FIG. 10, the first near-end microphone 20 is labelled $MIC_{11}$, the second near-end microphone 22 is labelled $MIC_{12}$, the first far-end microphone 38 is labelled $MIC_{21}$, and the second far-end microphone 40 is labelled $MIC_{22}$. In general, the far-end voice enhancement steering switch 168A designates either the first near-end microphone 20 labelled $MIC_{11}$ or the second near-end microphone 22 labelled $MIC_{12}$ as a primary near-end microphone. If neither of the near-end microphones $MIC_{11}$ or $MIC_{12}$ have a sound level exceeding the threshold switching value 66, FIG. 2A, the far-end voice enhancement steering switch 168A resides in the idle state 210. If the steering switch 168 is in the idle state and either of the near-end microphones $MIC_{11}$ or $MIC_{12}$ has a sound level exceeding the threshold switching value 66, FIG. 2A, the steering switch 168 switches to the respective state 212 or 214 as indicated by lines 212A and 214A. The far-end voice enhancement input signal in line 180A is a combination of the microphone signals from $MIC_{11}$ and $MIC_{12}$ with the designated primary microphone having 100% of the microphone output combined with approximately 1%–10% of the microphone output of the other near-end microphone. Note that the percentage of transmission of the microphone output signal from the microphone <u>not</u> designated as the primary microphone is preferably less than the same with respect to the telephone steering switch, for example 80A in FIGS. 9A and 9B. With the telephone steering switch 80A, it is desirable that the raw telephone input signal have a substantial sound level especially when speech is not present so that the line does not appear dead to a listener on the other end of the line on the telephone. In contrast, it is not necessary or even desirable for the far-end voice enhancement input signal in line 180A to have a detectable amount of background noise present within the signal, even when speech is not present. Therefore, only a small percentage, preferably undetectable by a driver and/or passenger within the vehicle, is transmitted as part of the far-end voice enhancement input signal 180A. It is desirable, however, that a small percentage of the microphone output be transmitted so that microphones in the "off" state do not click on and off, which would be annoying to the driver and/or passengers within the vehicle. The far-end voice enhancement steering switch 168A also includes a fade-out state 216 and a cross-fade state 218 which operate substantially as described with respect to FIGS. 4–7.

The near-end enhancement steering switch 168B operates preferably in a similar manner to the far-end voice enhancement 168A. The near-end voice enhancement switch 168B includes an idle state 220 in which the microphone output from both the first far-end microphone 38 labelled as $MIC_{21}$ and the second far-end microphone 40 labelled as $MIC_{22}$ have microphone output with a sound level below the threshold switching value 66, FIG. 2A. State 222 labelled $MIC_{21}$ indicates a state in which the first far-end microphone 38 is designated as the primary microphone. State 224 labelled $MIC_{22}$ represents the state in which the second far-end microphone 40 is designated as the primary microphone. The near-end voice enhancement steering switch 168B also includes a fade-out state 226 and a cross-fade state 228 which operate in a similar manner as described with respect to the far-end voice enhancement steering switch 168A and the telephone steering switch 80 described in FIGS. 4–7. As with the far-end voice enhancement steering switch 168A, the near-end voice enhancement steering switch 168B outputs the near-end voice enhancement input signal in line 180B which is a combination of 100% of the designated primary microphone 222 or 224 and preferably 1%–10% of the other microphone 24 or 22, respectively.

The invention has been described in accordance with a preferred embodiment of carrying out the invention, however, the scope of the following claims should not be limited thereto. Various modifications, alternatives or equivalents may be apparent to those skilled in the art, and the following claims should be interpreted to cover such modifications, alternatives and equivalents.

We claim:

1. An integrated vehicle voice enhancement system and hands-free cellular telephone system comprising:

a near-end acoustic zone;

a far-end acoustic zone;

a near-end microphone that sense sound in the near-end zone and generates a near-end voice signal;

a far-end microphone that sense sound in the far-end zone and generates a far-end voice signal;

a near-end loudspeaker that inputs a near-end input signal and outputs sound into the near-end zone;

a far-end loudspeaker that inputs a far-end input signal and outputs sound into the far-end zone;

a near-end adaptive acoustic echo canceler that receives the near-end input signal and generates a near-end echo cancellation signal;

a near-end echo cancellation summer that inputs the near-end voice signal and the near-end echo cancellation signal and outputs an echo-cancelled, near-end voice signal;

a far-end adaptive acoustic echo canceler that receives the far-end input signal and generates a far-end echo cancellation signal;

a far-end echo cancellation summer that inputs the far-end voice signal and the far-end echo cancellation signal and outputs an echo-cancelled, far-end voice signal;

a microphone steering switch that inputs the echo-cancelled, near-end voice signal and the echo-cancelled, far-end voice signal and outputs a telephone input signal; and a cellular telephone that inputs the telephone input signal;

wherein at least one noise reduction filter is used to improve the clarity of the telephone input signal inputting the cellular telephone;

wherein the noise reduction filter is a recursive implementation of a discrete cosine transform modified to stabilize its performance in a digital signal processor, each of the plurality of fixed filters is a finite impulse response filter, and the finite impulse response filters are represented by the following expression:

$$z_m(k) = \sum_{n=o}^{m-1}\left[\frac{Gm}{M}\gamma^N\cos\left(\frac{\pi(2n+1)m}{2M}\right)\right]\times(k-n)$$

where M is the number of fixed filters, x(k-n) is a time-shifted version of the raw input signal, n=0,1 . . . M-1, $z_m(k)$ is the filtered input signal for the $m^{th}$ filter, m=0,1, . . . M-1, $\gamma$ is a stability factor, and $G_m=1$ for m=0, and $G_m=2$ for $m\neq 0$.

2. An integrated vehicle voice enhancement system and hands-free cellular telephone system comprising:

a near-end acoustic zone;

a far-end acoustic zone;

a near-end microphone that senses sound in the near-end zone and generates a near-end voice signal;

a far-end microphone that sense sound in the far-end zone and generates a far-end voice signal;

a near-end loudspeaker that inputs a near-end input signal and outputs sound into the near-end zone;

a far-end loudspeaker that inputs a far-end input signal and outputs sound into the far-end zone;

a near-end adaptive acoustic echo canceler that receives the near-end input signal and generates a near-end echo cancellation signal;

a near-end echo cancellation summer that inputs the near-end voice signal and the near-end echo cancellation signal and outputs an echo-cancelled, near-end voice signal;

a far-end adaptive acoustic echo canceler that receives the far-end input signal and generates a far-end echo cancellation signal;

a far-end echo cancellation summer that inputs the far-end voice signal and the far-end echo cancellation signal and outputs an echo-cancelled, far-end voice signal;

a microphone steering switch that inputs the echo-cancelled, near-end voice signal and the echo-cancelled, far-end voice signal and outputs a telephone input signal; and a cellular telephone that inputs the telephone input signal;

wherein at least one noise reduction filter is used to improve the clarity of the telephone input signal inputting the cellular telephone, wherein the noise reduction filter is a recursive implementation of a discrete cosine transform modified to stabilize its performance in a digital signal processor, and the plurality of fixed filters are infinite impulse response filters.

3. An integrated vehicle voice enhancement system and hands-free cellular telephone system as recited in claim 2 wherein the infinite impulse response filters are represented by the following expressions:

$$z_0(k)=\left[\frac{1}{M}\right][x(k)-\gamma^M x(k-M)]+\gamma z_0(k-1)$$

for fixed filter m=0, and $$z_m(k)=\left[\frac{2}{M}\cos^2\left(\frac{\pi m}{2M}\right)\right]\big[(x(k)-\gamma x(k-1)+(-1)^m\gamma^{M+1}x(k-[M+1])-(-1)^m\gamma^M x(k-M)\big]+2\gamma\cos\left(\frac{\pi m}{M}\right)z_m(k-1)-\gamma^2 z_m(k-2)$$

for fixed filter m=1,2 . . . M-1, where $\gamma$ is a stability parameter, x(k) is the raw input signal for sampling period k, M is the number of fixed filters, and $z_m(k)$ is the filtered input signal for the $m^{th}$ filter, m=0,1 . . . M-1.

4. An integrated vehicle voice enhancement system and hands-free cellular telephone system comprising:

a near-end acoustic zone;

a far-end acoustic zone;

a near-end microphone that senses sound in the near-end zone and generates a near-end voice signal;

a far-end microphone that senses sound in the far-end zone and generates a far-end voice signal;

a near-end loudspeaker that inputs a near-end input signal and outputs sound into the near-end zone;

a far-end loudspeaker that inputs a far-end input signal and outputs sound into the far-end zone;

a near-end adaptive acoustic echo canceler that receives the near-end input signal and generates a near-end echo cancellation signal;

a near-end echo cancellation summer that inputs the near-end voice signal and the near-end echo cancellation signal and outputs an echo-cancelled, near-end voice signal;

a far-end adaptive acoustic echo canceler that receives the far-end input signal and generates a far-end echo cancellation signal;

a far-end echo cancellation summer that inputs the far-end voice signal and the far-end echo cancellation signal and outputs an echo-cancelled, far-end voice signal;

a microphone steering switch that inputs the echo-cancelled, near-end voice signal and the echo-cancelled, far-end voice signal and outputs a telephone input signal; and a cellular telephone that inputs the telephone input signal;

wherein at least one noise reduction filter is used to improve the clarity of the telephone input signal inputting the cellular telephone wherein the noise reduction filter comprises:

a plurality of fixed filters, each fixed filter inputting a raw input signal derived from at least one of the systems microphone signals and outputting a respective filtered signal;

a time-varying filter gain element corresponding to each fixed filter that inputs the respective filtered signal and outputs a weighted and filtered signal, each time-varying filter gain element having a value that varies over time in proportion to a signal strength level for the respective filtered signal; and a summer that inputs the weighted and filtered input signals and outputs a noise reduced signal, and wherein the value of each time-varying filter gain element is determined in accordance with the following expression:

$$\beta_m(k)=\left[1-\frac{1}{SSL_m(k)+\alpha}\right]^{\mu}$$

where $\beta_m(k)$ is the value of the time-varying filter gain element for the $m^{th}$ fixed filter at sampling period k, m=0,1 . . . M-1, $SSL_m(k)$ is the speech strength level for the respective filtered telephone input signal at sampling period k, and $\mu$ and $\alpha$ are preselected performance parameters having values greater than 0.

5. An integrated vehicle voice enhancement system and hands-free cellular telephone system as recited in claim 4 wherein time-varying filter gain elements $\beta_m(k)$ for the $m^{th}$ fixed filter is set equal to zero if noise power for the respective frequency band is greater than a preselected threshold value.

6. An integrated vehicle voice enhancement system and hands-free cellular telephone system as recited in claim 4 wherein the performance parameter $\mu$ is approximately equal to 4 and the performance parameter $\alpha$ is approximately equal to 2.

7. An integrated vehicle voice enhancement system and hands-free cellular telephone system as recited in claim 4 wherein the speech strength level for the respective filtered input signal at sample period k is determine in accordance with the following expression:

$$SSL_m(k)=\frac{\text{s\_pwr}_m(k)}{\text{n\_pwr}_m(k)}$$

where $s\_pwr_m(k)$ is an estimate of combined speech and noise power in the $m^{th}$ filtered input signal at sample period k and $n\_pwr_m(k)$ is an estimate of noise power in the $m^{th}$ filtered input signal used for sample period k.

8. An integrated vehicle voice enhancement system and hands-free cellular telephone system as recited in claim 7 wherein the noise power level estimate $n\_pwr_m(k)$, m=0,1 . . . M-1 for sample period k for each of the filtered input signals is accomplished in accordance with the following expression:

$$n\_pwr_m(k)=n\_pwr_m(k-1)+\lambda_o(z_m(k)*z_m(k)-n\_pwr_m(k-1))$$

where $z_m(k)$ is the value of the respective filtered input signal at sample period k when speech is not present in the raw input signal, and $\lambda_o$ is a fixed time constant.

9. An integrated vehicle voice enhancement system and hands-free cellular telephone system as recited in claim 8 wherein time constant $\lambda_o$ is set to a small value, thereby providing a long averaging window for estimating the noise power level.

10. An integrated vehicle voice enhancement system and hands-free cellular telephone system as recited in claim 7 wherein the combined speech and noise power level $s\_pwr_m(k)$, m=0,1 . . . M-1 for sample period k for each of the filtered input signals is estimated in accordance with the following expression:

$$s\_pwr_m(k)=s\_pwr_m(k-1)+\lambda_m(z_m(k)*z_m(k)-s\_pwr_m(k-1)$$

where $z_m(k)$ is the value of the respective filtered input signal at sample period k and $\lambda_m$ is a fixed time constant for the estimate of the combined speech and noise power level for each respective filtered input signal.

11. An integrated vehicle voice enhancement system and hands-free cellular telephone system comprising:

a near-end acoustic zone;

a far-end acoustic zone;

a plurality of near-end microphones that each sense sound in the near-end zone and each generate a near-end voice signal;

a plurality of far-end microphones that each sense sound in the far-end zone and each generate a far-end voice signal;

at least one near-end loudspeaker that inputs a near-end input signal and outputs sound into the near-end zone;

at least one far-end loudspeaker that inputs a far-end input signal and outputs sound into the far-end zone;

one or more near-end adaptive echo cancellation channels, each receiving a respective near-end input signal and outputting a near-end cancellation signal for an associated near-end microphone;

a near-end echo cancellation summer of each near-end microphone that inputs the respective near-end voice signal from the respective near-end microphone and any near-end echo cancellation signal form the associated one or more near-end adaptive echo cancellation channels, and outputs a respective echo-cancelled, near-end voice signal;

one or more far-end adaptive echo cancellation channels, each receiving a respective far-end input signal and outputting a far-end echo cancellation signal for an associated far-end microphone;

a far-end echo cancellation summer for each far-end microphone that inputs the far-end voice signal from the respective far-end microphone and any far-end echo cancellation signal from the associated one or more far-end adaptive echo cancellation channels, and output a respective echo-cancelled, far-end voice signal;

a microphone steering switch that inputs the echo-cancelled, near-end voice signals and the echo-cancelled far-end voice signals and outputs a telephone input signal;

a cellular telephone that inputs the telephone input signal;

wherein at least one noise reduction filter is used to improve the clarity of the telephone input signal inputting the cellular telephone, p1 wherein the noise reduction filter is a recursive implementation of a discrete cosine transform modified to stabilize its performance on a digital signal processor, each of the plurality of fixed filters is a finite impulse response filter, and the finite impulse response filters are represented by the following expression:

$$z_m(k) = \sum_{n=o}^{m-1} \left[ \frac{Gm}{M} \gamma^N \cos\left( \frac{\pi(2n+1)m}{2M} \right) \right] \times (k-n))$$

where M is the number of fixed filters, x(k-n) is a time-shifter version of the raw telephone input signal, n=0,1 . . . M-1, $z_m(k)$ is the filtered telephone input signal for the $m^{th}$ filter, m=0,1, . . . M-1, γ is a stability factor, and $G_m=1$ for m=0, and $G_m=2$ for m≠0.

12. An integrated vehicle voice enhancement system and hands-free cellular telephone system comprising:

a near-end acoustic zone;

a far-end acoustic zone;

a plurality of near-end microphones that each sense sound in the near-end zone and each generate a near-end voice signal;

a plurality of far-end microphones that each sense sound in the far-end zone and each generate a far-end voice signal;

at least one near-end loudspeaker that inputs a near-end input signal and outputs sound into the near-end zone;

at least one far-end loudspeaker that inputs a far-end input signal and outputs sound into the far-end zone;

one or more near-end adaptive echo cancellation channels, each receiving a respective near-end input signal and outputting a near-end cancellation signal for an associated near-end microphone;

a near-end echo cancellation summer for each near-end microphone that inputs the respective near-end voice signal from the respective near-end microphone and any near-end echo cancellation signal from the associated one or more near-end adaptive echo cancellation channels, and outputs a respective echo-cancelled, near-end voice signal;

one or more far-end adaptive echo cancellation channels, each receiving a respective far-end input signal and outputting a far-end echo cancellation signal for an associated far-end microphone;

a far-end echo cancellation summer for each far-end microphone that inputs the far-end voice signal from the respective far-end microphone and any far-end echo cancellation signal from the associated one or more far-end adaptive echo cancellation channels, and outputs a respective echo-cancelled, far-end voice signal;

a microphone steering switch that inputs the echo-cancelled, near-end voice signals and the echo-cancelled far-end voice signals and outputs a telephone input signal;

a cellular telephone that inputs the telephone input signal;

wherein at least one noise reduction filter is used to improve the clarity of the telephone input signal inputting the cellular telephone, wherein the noise reduction filter is a recursive implementation of a discrete cosine transform modified to stabilize its performance on a digital signal processor, the plurality of fixed filters are infinite impulse response filters, and the infinite impulse response filters are represented by the following expressions:

$$z_0(k) = \left[\frac{1}{M}\right] [x(k) - \gamma^M x(k-M)] + \gamma z_0(k-1)$$

for fixed filter m=0, and $$z_m(k) = \left[\frac{2}{M}\cos^2\left(\frac{\pi m}{2M}\right)\right] \left[x(k) - \gamma x(k-1) + (-1)^m \gamma^{M+1} x(k-[M+1]) - (-1)^m \gamma^M x(k-M)\right] + 2\gamma\cos\left(\frac{\pi m}{M}\right) z_m(k-1) - \gamma^2 z_m(k-2)$$

for fixed filter m=1,2 . . . M-1, where γ is a stability parameter, x(k) is the raw telephone input signal for sampling period k, M is the number of fixed filters, and $z_m$ is the filtered telephone input signal for the $m^{th}$ filter, m=0,1 . . . M-1.

13. An integrated vehicle voice enhancement system and hands-free cellular telephone system comprising:

a near-end acoustic zone;

a far-end acoustic zone;

a plurality of near-end microphones that each sense sound in the near-end zone and each generate a near-end voice signal;

a plurality of far-end microphones that each sense sound in the far-end zone and each generate a far-end voice signal;

at least one near-end loudspeaker that inputs a near-end input signal and outputs sound into the near-end zone;

at least one far-end loudspeaker that inputs a far-end input signal and outputs sound into the far-end zone;

one or more near-end adaptive echo cancellation channels, each receiving respective near-end input signal and outputting a near-end echo cancellation signal for an associated near-end microphone;

a near-end cancellation summer for each near-end microphone that inputs the respective near-end voice signal from the respective near-end microphone and any near-end echo cancellation signal from the associated one or more near-end adaptive echo cancellation channels, and outputs a respective echo-cancelled, near-end voice signal;

one or more far-end adaptive echo cancellation channels, each receiving a respective far-end input signal and outputting a far-end echo cancellation signal for an associated far-end microphone;

a far-end echo cancellation summer for each far-end microphone that inputs the far-end voice signal from the respective far-end microphone and any far-end echo cancellation signal from the associated one or more far-end adaptive echo cancellation channels, and outputs a respective echo-cancelled, far-end voice signal;

a microphone steering switch that inputs the echo-cancelled, near-end voice signals and the echo-cancelled far-end voice signals and outputs a telephone input signal;

a cellular telephone that inputs the telephone input signal;

wherein at least one noise reduction filter is used to improve the clarity of the telephone input signal inputting the cellular telephone;

wherein the noise reduction filter comprises:

a plurality of fixed filters, each fixed filter inputting a raw input signal derived from at least one of the systems microphone signals and outputting a respective filtered signal;

a time-varying filter gain element corresponding to each fixed filter that inputs the respective filter signal and outputs a weighted and filtered signal, each time-varying filter gain element having a value that varies over time in proportion to a signal strength level for the respective filtered signal; and a summer that inputs the weighted and filtered input signals and outputs a noise reduced signal, and wherein the value of each time-varying filter gain element is determined in accordance with the following expression:

$$\beta_m(k) = \left[1 - \frac{1}{SSL_m(k) + \alpha}\right]^\mu$$

where $\beta_m(k)$ is the value of the time-varying filter gain element for the $m^{th}$ fixed filter at sampling period k, m=0,1 . . . M-1, $SSL_m(k)$ is the speech strength level for the respective filtered telephone input signal at sampling period k, and $\mu$ and $\alpha$ are preselected performance parameters having values greater than 0.

14. An integrated vehicle voice enhancement system and hands-free cellular telephone system as recited in claim 13 wherein time-varying filter gain elements $\beta_m(k)$ for the $m^{th}$ fixed filter is set equal to zero if noise power for the respective frequency band is greater than a preselected threshold value.

15. An integrated vehicle voice enhancement system and hands-free cellular telephone system as recited in claim 13 wherein the performance parameter $\mu$ is approximately equal to 4 and the performance parameter $\alpha$ is approximately equal to 2.

16. An integrated vehicle voice enhancement system and hands-free cellular telephone system as recited in claim 13 wherein the speech strength level for the respective filtered input signal at sample period k is determine in accordance with the following expression:

$$SSL_m(k) = \frac{s\_pwr_m(k)}{n\_pwr_m(k)}$$

where $s\_pwr_m(k)$ is an estimate of combined speech and noise power in the $m^{th}$ filtered input signal at sample period k and $n\_pwr_m(k)$ is an estimate of noise power in the $m^{th}$ filtered input signal used for sample period k.

17. An integrated vehicle voice enhancement system and hands-free cellular telephone system as recited in claim 16 wherein the noise power level estimate $n\_pwr_m(k)$, m=0,1 . . . M-1 for sample period k for each of the filtered input signals is accomplished in accordance with the following expression:

$$n\_pwr_m(k)=n\_pwr_m(k-1)+\lambda_o(z_m(k)*z_m(k)-n\_pwr_m(k-1))$$

where $z_m(k)$ is the value of the respective filtered input signal at sample period k when speech is not present in the raw input signal, and $\lambda_o$ is a fixed time constant.

18. An integrated vehicle voice enhancement system and hands-free cellular telephone system as recited in claim 17 wherein time constant $\lambda_o$ is set to a small value, thereby providing a long averaging window for estimating the noise power level.

19. An integrated vehicle voice enhancement system and hands-free cellular telephone system as recited in claim 16 wherein the combined speech and noise power level $s\_pwr_m(k)$, m=0,1 . . . M-1 for sample period k for each of the filtered input signals is estimated in accordance with the following expression:

$$s\_pwr_m(k)=s\_pwr_m(k-1)+\lambda_m)z_m(k)*z_m(k)-s\_pwr_m(k-1))$$

where $z_m(k)$ is the value of the respective filtered input signal at sample period k and $\lambda_m$ is a fixed time constant for the estimate of the combined speech and noise power level for each respective filtered input signal.

20. A method of generating a noise-reduced telephone input signal in a hands-free telephone system for a vehicle, the method comprising the steps of:

sensing background noise within the vehicle and driver and passenger speech within the vehicle using at least one microphone located within the vehicle, and generating an input signal in response thereto;

filtering the input signal through a plurality of M fixed filters to generate a plurality of M filtered input signals, the fixed filters being a recursive implementation of a discrete cosine transform modified to stabilize its performance on a digital signal processor;

estimating a noise power level for each of the M filtered input signals;

estimating a combined speech and noise power level of each of the M filtered input signals;

weighting each of the plurality of M filtered input signals by a respective time-varying filter gain $\beta_m$ which is determined in accordance with the respective estimate of the combined speech and noise power level and the estimate of the noise power level; and combining the M weighted and filtered input signals to form a noise-reduced input signal, wherein the noise power level estimate for sample period k for each of the M filtered input signals $n\_pwr_n(k)$, m=0,1 . . . M-1, is accomplished in accordance with the following expression:

$$n\_pwr_m(k)=n\_pwr_m(k-1)+\lambda_o(z_m(k)*z_m(k)-n\_pwr_m(k-1))$$

where $z_m(k)$ is the value of the respective filtered input signal at sample period k when speech is not present in the raw input signal, and $\lambda_0$ is a fixed time constant.

21. An integrated vehicle voice enhancement system and hands-free cellular telephone system as recited in claim 20 wherein time-varying filter again elements $\beta_m(k)$ for the $m^{th}$ fixed filter is set equal to zero if noise power for the respective frequency band is greater than a preselected threshold value.

22. A method as recited in claim 20 wherein the time constant $\lambda_o$ is set to a small value, thereby providing a long averaging window for estimating the noise power level $n\_pwr_m(k)$.

23. A method as recited in claim 20 wherein the combined speech and noise power level for sample period k for each of the M filtered input signals, $s_{\_pwrm}(k)$, m=0,1 . . . M-1, is accomplished in accordance with the following expression:

$$s\_pwr_m(k)=s\_pwr_m(k-1)+\lambda_m(z_m(k)*z_m(k)-s\_pwr_m(k-1))$$

where $z_m(k)$ is the value of the respective filtered input signal at sample period k, and $\lambda_m$ is a fixed time constant for the combined speech and noise power level estimate for each of the M fixed filters.

24. A method as recited in claim 23 wherein the M time-varying filter gains $\beta_m(k)$ are determined in accordance with the following expressions:

$$\beta_m(k) = \left[1 - \frac{1}{SSL_m(k) + \alpha}\right]^{\mu}$$

-continued $$SSL_m(k) = \frac{\text{s\_pwr}_m(k)}{\text{n\_pwr}_m(k)}$$

where $\alpha$, $\mu \geqq 0$ are performance parameters, and $SSL_m(k)$ is the speech strength level for the $m^{th}$ filtered input signal at sample period (k).

25. A method of generating a noise-reduced telephone input signal in a hands-free telephone system for a vehicle, the method comprising the steps of:

sensing background noise within the vehicle and driver and passenger speech within the vehicle using at least one microphone located within the vehicle, and generating an input signal in response thereto;

filtering the input signal through a plurality of M fixed filters to generate a plurality of M filtered input signals, the fixed filters being a recursive implementation of a discrete cosine transform modified to stabilize its performance on a digital signal processor;

estimating a noise power level for each of the M filtered input signals;

estimating a combined speech and noise power level of each of the M filtered input signals;

weighting each of the plurality of M filtered input signals by a respective time-varying filter gain $\beta_m$ which is determined in accordance with the respective estimate of the combined speech and noise power level and the estimate of the noise power level; and combining the M weighted and filtered input signals to form a noise-reduced input signal;

wherein the plurality of fixed filters are infinite impulse response filters represented by the following expressions:

$$z_0(k) = \left[\frac{1}{M}\right][(x(k) - \gamma^m x(k-M)] + \gamma z_0(k-1)$$

for m=0

$$z_m(k) = \left[\frac{2}{M}\cos^2\left(\frac{\pi m}{2M}\right)\right]\big[(x(k) - \gamma x(k-1) + (-1)^m\gamma^{M+1}x(k-[M+1]) - (-1)^m\gamma^M x(k-M)\big] + 2\gamma\cos\left(\frac{\pi m}{M}\right)z_m(k-1) - \gamma^2 z_m(k-2)$$

for m=1,2 . . . M-1 where $\gamma$ is a preselected stability parameter, x(k) is the raw input signal for sample period k, and $z_m$ is the filtered input signal for the $m^{th}$ fixed filter m=0,1 . . . M-1.

* * * * *